US008114490B2

(12) United States Patent
Slovencik et al.

(10) Patent No.: US 8,114,490 B2
(45) Date of Patent: Feb. 14, 2012

(54) CUSHIONING PRODUCT AND METHOD AND APPARATUS FOR MAKING SAME

(75) Inventors: Jean-Marc Slovencik, Uhrwiller (FR); Paul Deis, Hagenau (FR)

(73) Assignee: Storopack Hans Reichenecker GmbH, Metzingen (DE)

(*) Notice: Subject to any disclaimer, the term of this patent is extended or adjusted under 35 U.S.C. 154(b) by 352 days.

(21) Appl. No.: 11/627,721

(22) Filed: Jan. 26, 2007

(65) Prior Publication Data

US 2007/0122575 A1 May 31, 2007

Related U.S. Application Data

(63) Continuation of application No. 10/445,212, filed on May 23, 2003, now abandoned, which is a continuation of application No. 10/385,013, filed on Mar. 10, 2003, now abandoned.

(30) Foreign Application Priority Data

Sep. 17, 2002 (DE) ................................ 102 42 998

(51) Int. Cl.
*B32B 1/08* (2006.01)
*B32B 23/00* (2006.01)

(52) U.S. Cl. ..................... 428/34.2; 428/34.1; 428/34.3; 428/35.7; 428/35.9; 428/36.9

(58) Field of Classification Search ................. 428/34.1, 428/34.2, 34.3, 35.7, 35.9, 36.9
See application file for complete search history.

(56) References Cited

U.S. PATENT DOCUMENTS

| | | | | |
|---|---|---|---|---|
| 2,786,399 | A | 3/1957 | Mason et al. | |
| 3,610,115 | A | 10/1971 | Rose et al. | |
| 3,650,877 | A | 3/1972 | Johnson | |
| 3,859,897 | A * | 1/1975 | Higa | 493/276 |
| 4,032,176 | A | 6/1977 | Tabary | |
| 4,162,557 | A | 7/1979 | Rasmussen | |
| 4,550,472 | A | 11/1985 | Temple et al. | |
| 4,590,479 | A | 5/1986 | Ben-Dov | |
| 4,687,153 | A * | 8/1987 | McNeil | 242/521 |
| 4,773,127 | A | 9/1988 | Stall | |
| 4,924,552 | A | 5/1990 | Sullivan | |
| 5,027,988 | A | 7/1991 | Corbiere | |
| 5,056,293 | A | 10/1991 | Richards et al. | |
| 5,173,352 | A | 12/1992 | Parker | |
| 5,350,268 | A * | 9/1994 | Muller | 412/1 |
| 5,403,259 | A | 4/1995 | Parker | |
| 5,816,995 | A | 10/1998 | Tekavec et al. | |

(Continued)

FOREIGN PATENT DOCUMENTS

EP 0679504 11/1995

(Continued)

OTHER PUBLICATIONS

Office Action, U.S. Appl. No. 11/928,306, dated Apr. 29, 2010.

(Continued)

*Primary Examiner* — Marc Patterson
(74) *Attorney, Agent, or Firm* — Wood, Herron & Evans, LLP

(57) ABSTRACT

The invention relates to a crumpled paper tube for use as a cushion in packing items, and to a method and apparatus for producing the same.

16 Claims, 24 Drawing Sheets

U.S. PATENT DOCUMENTS

Figure 1:
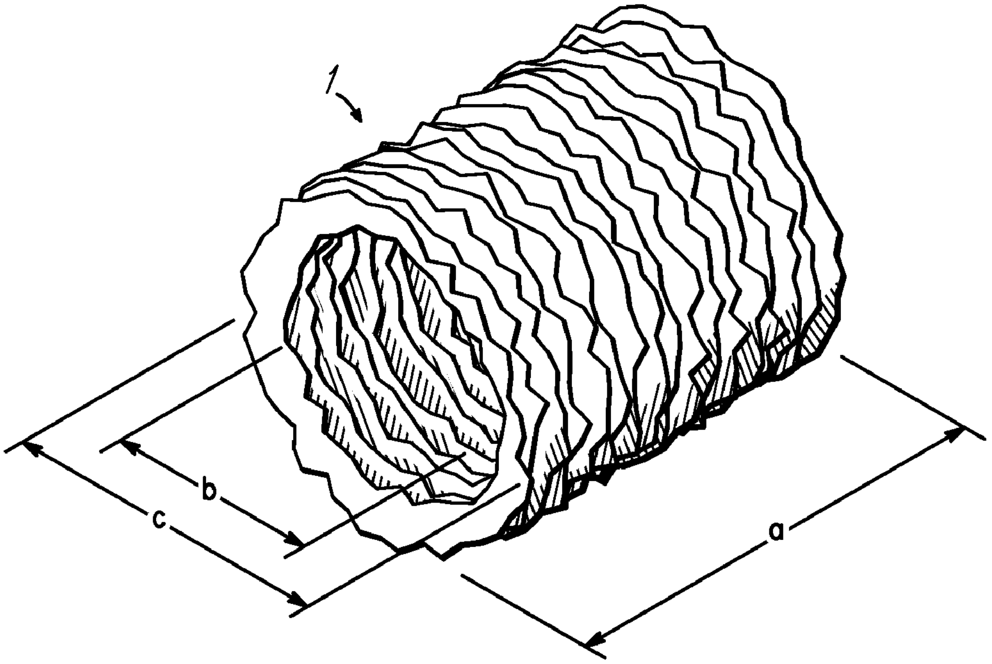

| | | | | |
|---|---|---|---|---|
| 5,943,523 | A | 8/1999 | Merle et al. | |
| 5,989,176 | A | 11/1999 | Ratzel et al. | |
| 6,015,374 | A | 1/2000 | Murphy et al. | |
| 6,035,613 | A * | 3/2000 | Lencoski et al. | 53/472 |
| 6,082,079 | A | 7/2000 | Kuehl et al. | |
| 6,106,452 | A | 8/2000 | Baumuller | |
| 6,168,847 | B1 | 1/2001 | Murphy et al. | |
| 6,179,765 | B1 | 1/2001 | Toth | |
| 6,183,586 | B1 | 2/2001 | Heidelberger | |
| 6,217,501 | B1 | 4/2001 | Simmons et al. | |
| 6,277,459 | B1 | 8/2001 | Lencoski et al. | |
| 6,436,511 | B1 | 8/2002 | Ratzel | |
| 6,540,652 | B1 | 4/2003 | Ratzel et al. | |

FOREIGN PATENT DOCUMENTS

| | | |
|---|---|---|
| EP | 0813953 | 12/1997 |

OTHER PUBLICATIONS

Office Action, U.S. Appl. No. 11/928,306, 8 pages, Aug. 27, 2010.

* cited by examiner

CUSHIONING PRODUCT AND METHOD AND APPARATUS FOR MAKING SAME

RELATED APPLICATIONS

This application is a continuation of US application Ser. No. 10/445,212 filed May 23, 2003, now abandoned, which is a continuation-in-part of U.S. application Ser. No. 10/385,013 filed Mar. 10, 2003, now abandoned, which is a 371 of German application Ser. No. 10242998.7 filed Sep. 17, 2002, all of which are hereby incorporated by reference herein.

FIELD OF THE INVENTION

The invention relates to a cushion of paper, and to a method and an apparatus for producing it.

BACKGROUND OF THE INVENTION

In packing various items, many kinds of cushions for filling voids are known, which are produced from paper web by crumpling. They are based on folding or rolling the edges of a paper web inwardly and then crumpling the folded or rolled paper web. From this continuously created web, individual cushion portions are then cut off to a desired length.

The object of the present invention is to create a paper cushion which has improved cushioning properties and is less expensive. Improved cushioning properties means that the product has higher resiliency and/or elasticity, or in other words provides better cushioning of items packed, in proportion to the quantity of paper used. A cushioning product is less expensive if less paper is required to fill a given volume, for example on the basis of the way in which the cushioning product is shaped.

SUMMARY OF THE INVENTION

One such product is characterized according to the invention in that the cushion is a crumpled paper tube. A paper tube, in the opened-out state, is upset and thereby crumpled. In comparison with previous products, more air is “trapped” inside this crumpled tube. The circular cross-section disposition of the paper leads to improved properties in cushioning and padding packed items.

These properties are improved still further by preferably providing that the paper tube is crumpled in the longitudinal direction and in the radial direction.

The cushioning properties are furthermore improved if the paper tube is provided in the longitudinal direction with a strip of paper or adhesive. This is expediently effected by providing that this strip and/or this adhesive is formed when a paper tube is produced from a paper web by folding or rolling in the edges and joining them together.

It is especially advantageous to use kraft paper, which is already intrinsically especially stable.

For producing such a cushion, it is expedient beforehand to “configure” a paper tube, that is, to prepare it, specifically by providing that one or more paper webs are joined together along their edges, for instance by directly adhesively bonding overlapping regions or by gluing strips on. These paper tube webs are then processed further to form the cushions or cushion portions in the apparatuses suitable for that purpose.

A paper tube web prepared and put together in this way can as a result be made smaller, or in other words narrower, by providing that along the two outer sides of the paper tube, in the flatly put-together state, indented folds are provided. Thus in a small space, more paper can be furnished and transported to the places where the paper tube web is processed further.

The paper tube web is preferably provided with intended tearing points at prepared, standardized intervals. These are points which tear when tension is exerted, as a consequence of the weakening of the material brought about by them. In other words, if tension is exerted on the paper tube web, it tears at the points where it is “supposed to” tear as intended. These points are preferably formed by a perforation and/or by certain notches or recesses.

The method for producing the cushion and the apparatus suitable for it are embodied such that the paper tube is slipped onto a core, which distributed over its circumference has rollers (inner rollers) that cooperate with rollers disposed outside the core (outer rollers), at least some of which are driven, and that thus draw in the paper tube, pass it between them, and crumple it. This is preferably accomplished by providing that two groups of rollers, spaced apart from one another in the longitudinal direction, are provided, which are driven at different circumferential speeds, so that between the two groups of rollers, crumpling by way of creasing of the paper material comprising the paper tube web occurs, and this creasing is crumpled further upon the passage through the second group of rollers.

This can be improved still further by providing that within the second-named group of rollers, further rollers are provided, which are disposed on a smaller boundary circle, so that the already-crumpled paper tube is also pushed together in the radial direction and crumpled anew on passing through the last-named rollers.

An apparatus for producing a cushion of paper comprises the provision of feeder means for the paper tube web that slip it onto a core and the provision of crumpling means, which crumple the paper tube web that has been opened out by being slipped onto the core. The feeder means are formed by rollers disposed in a first plane transverse to the feeding direction, which are provided both on the core (“inner rollers”) and outside the core (“outer rollers”) in the apparatus; all of these rollers initially continuously open out the paper tube once it has been inserted and then slip it onto the core. In further planes extending perpendicular to the transport direction of the paper tube web, further groups of rollers can be provided. They then, as already described, accomplish the crumpling in that first a circumferential creasing occurs by virtue of longitudinal compression, and then a radial compacting occurs by virtue of radial compression ensues.

Exemplary embodiments of the invention and advantageous refinements of them will be described below.

BRIEF DESCRIPTION OF THE DRAWINGS OF THE INVENTION

Figure 2:
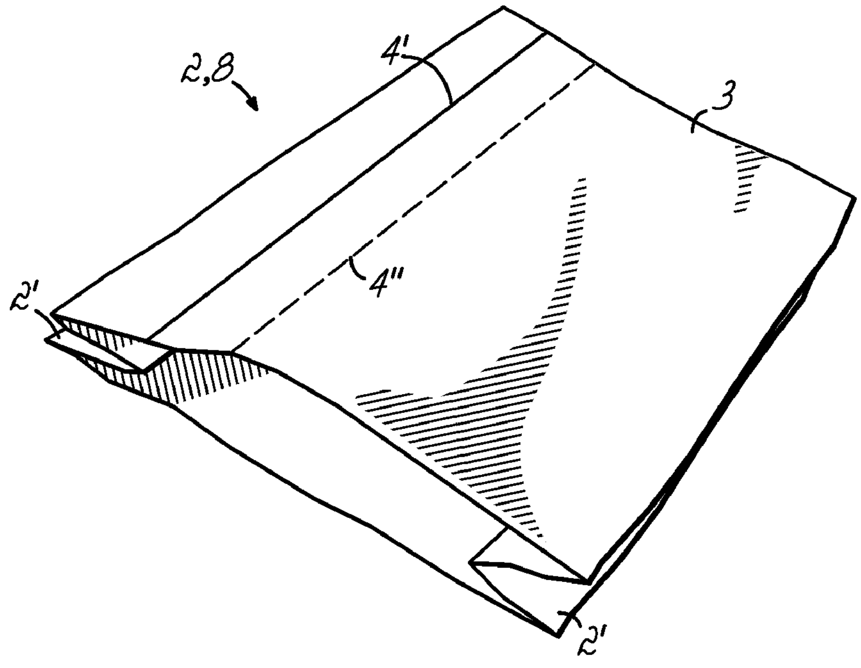
Figure 3A:
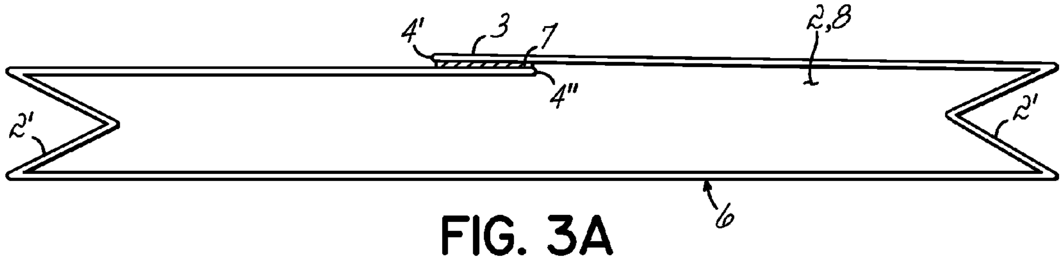
Figure 3B:
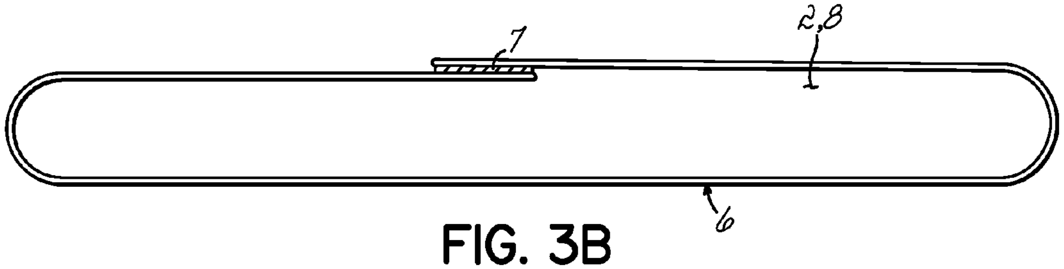
Figure 3C:
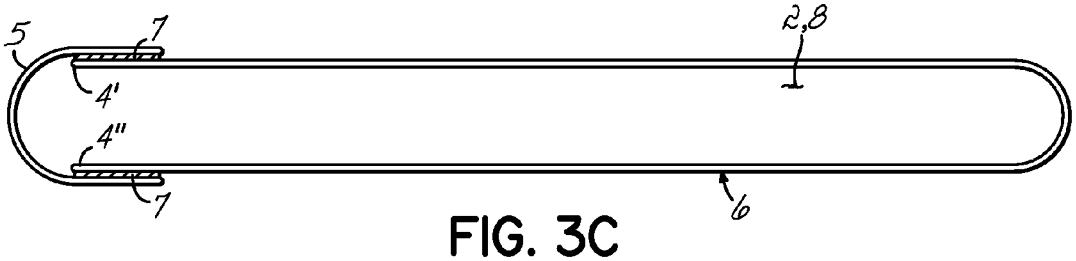
Figure 3D:
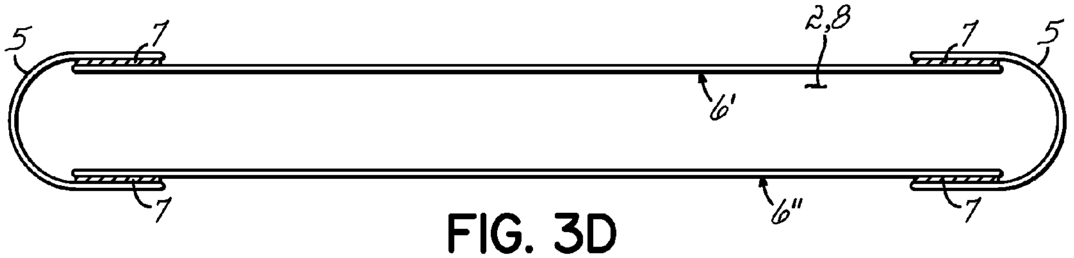
Figure 3E:
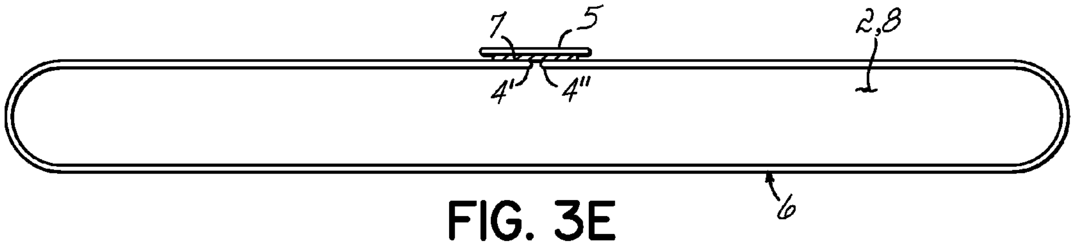
Figure 3F:
Figure 4:
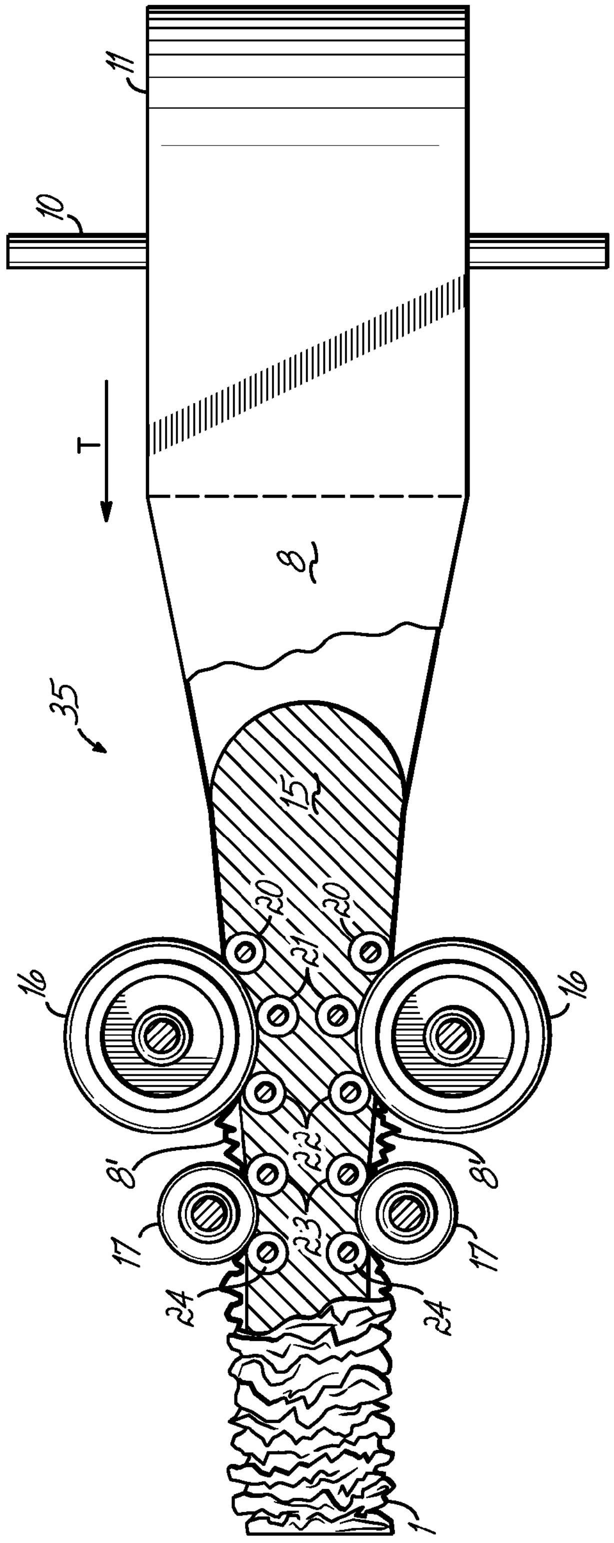
Figure 4A:
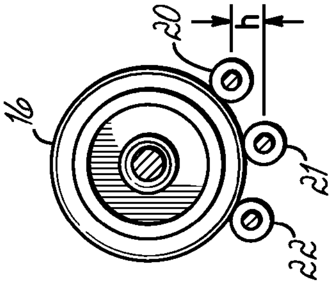
Figure 6:
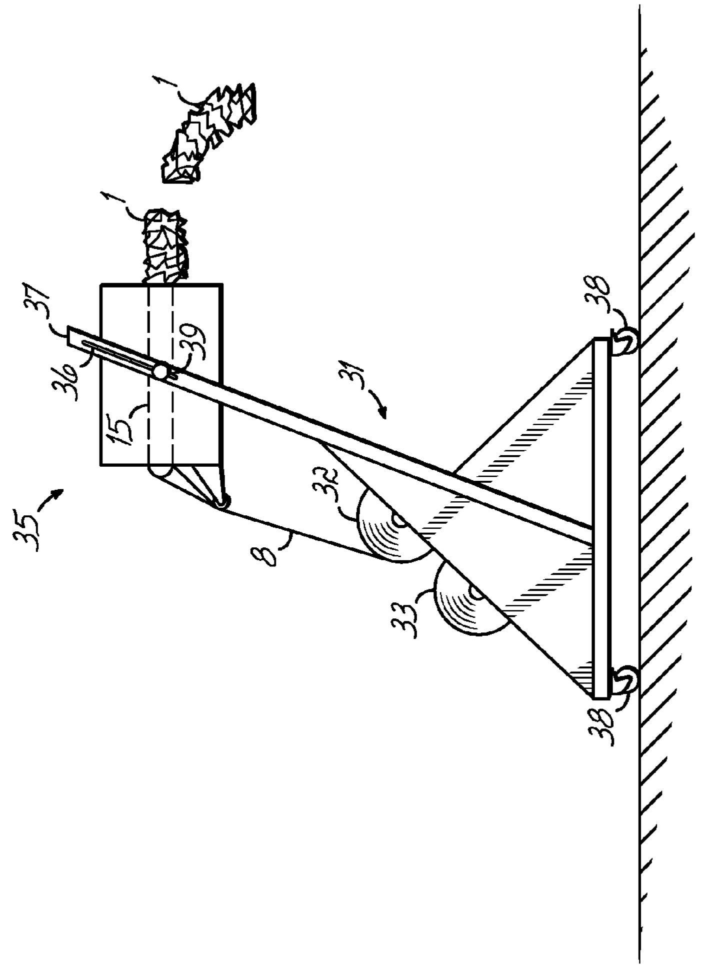
Figure 5:
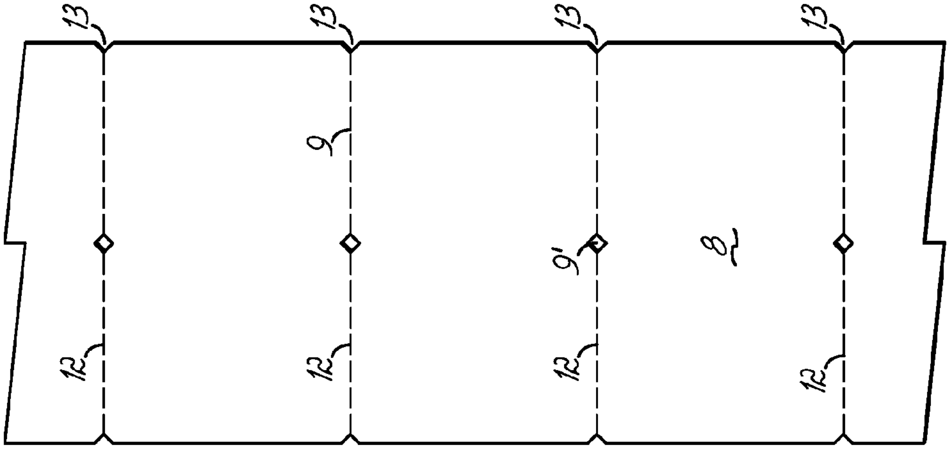
Figure 7:
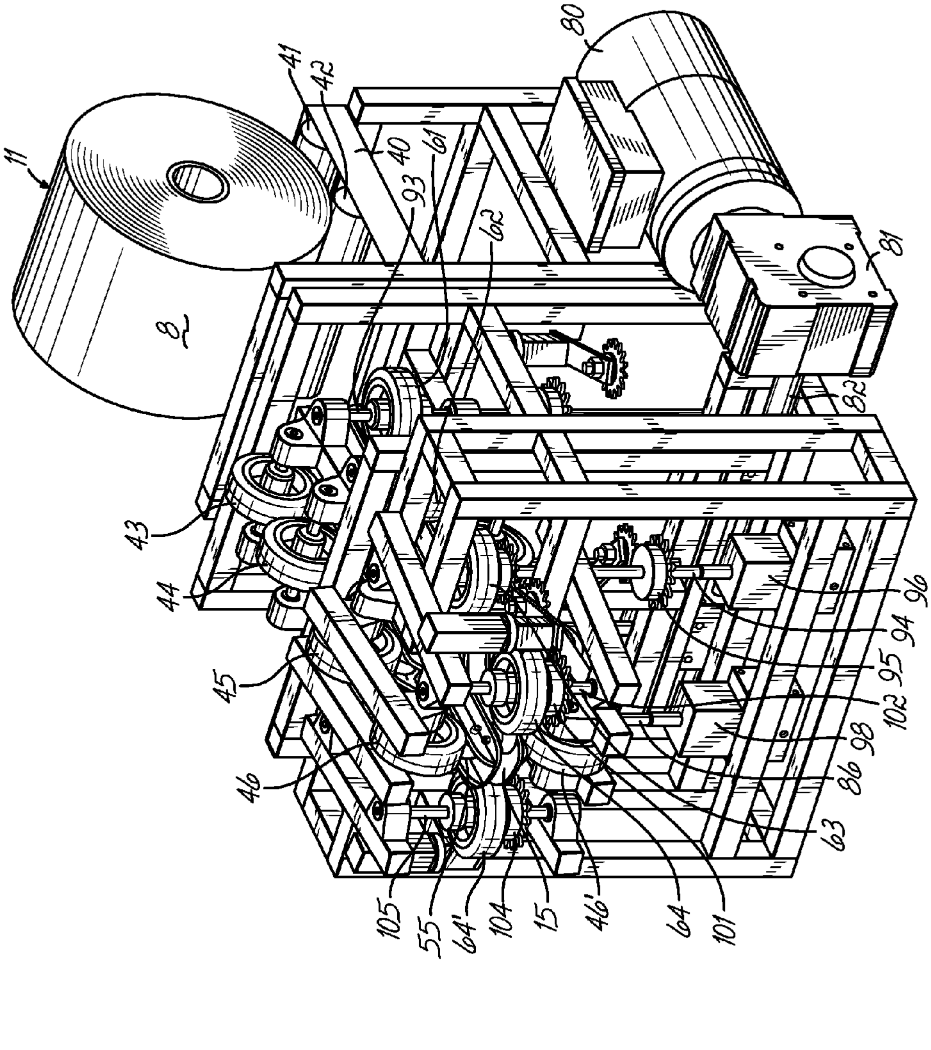
Figure 8:
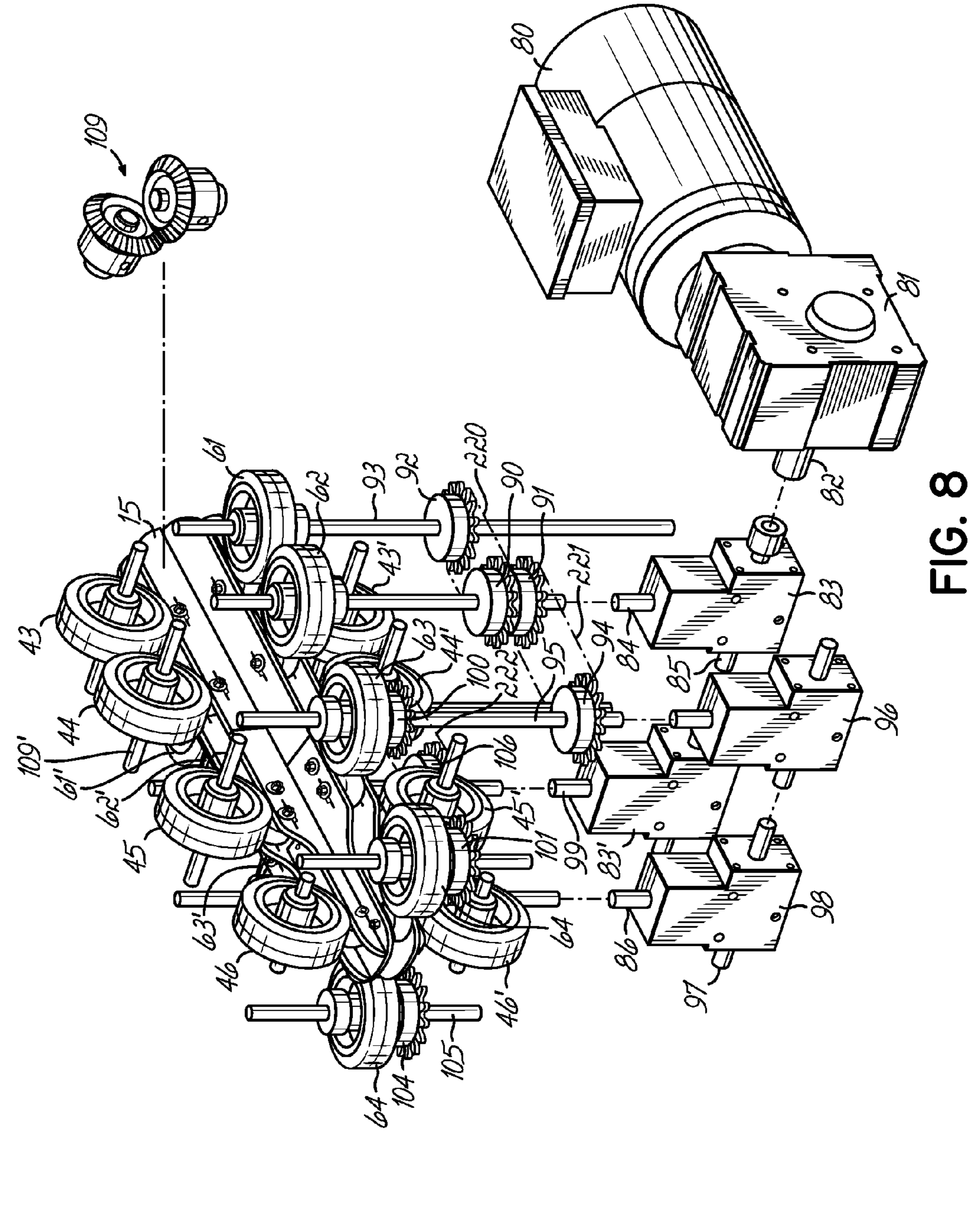
Figure 8A:
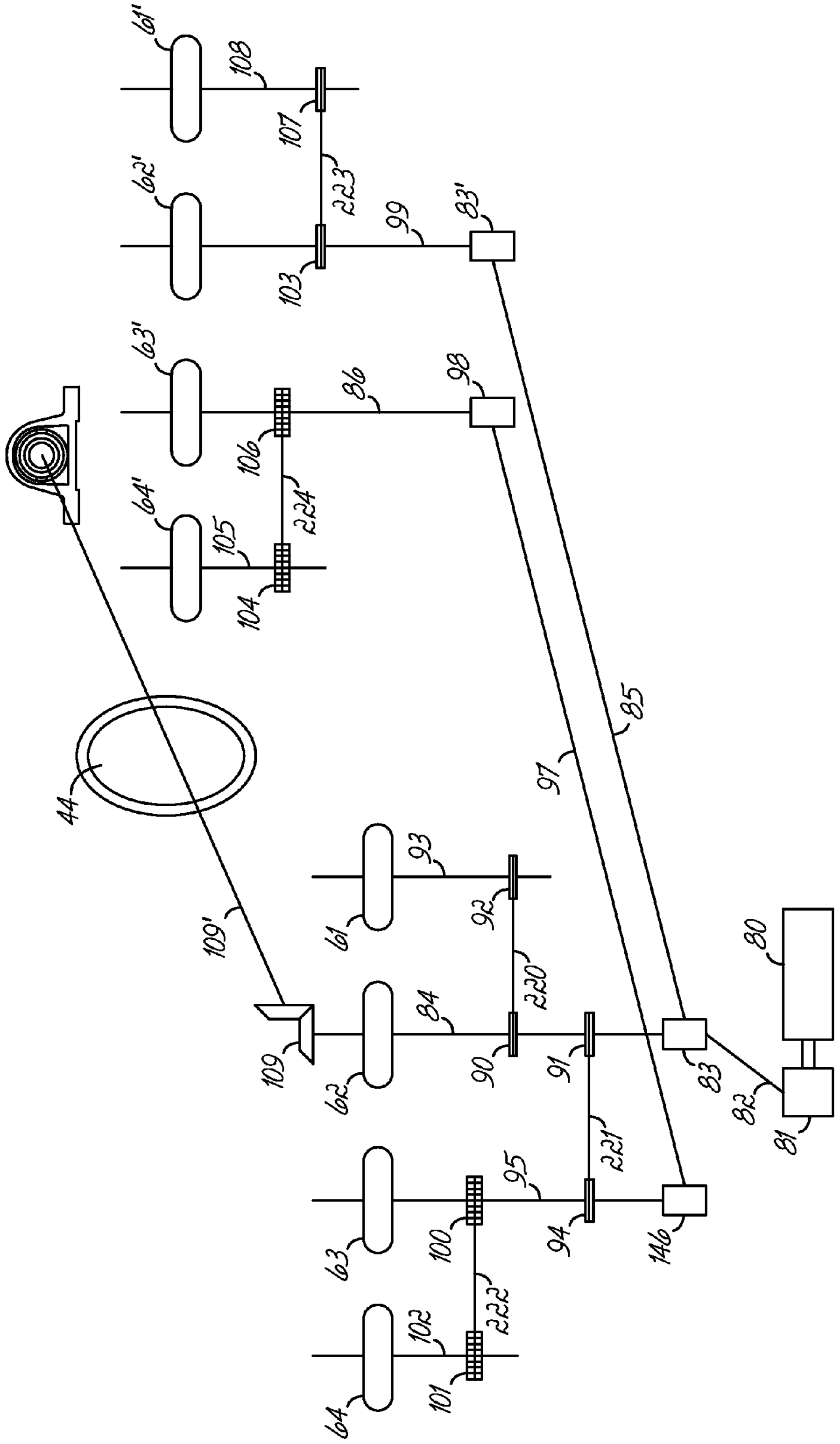
Figure 9:
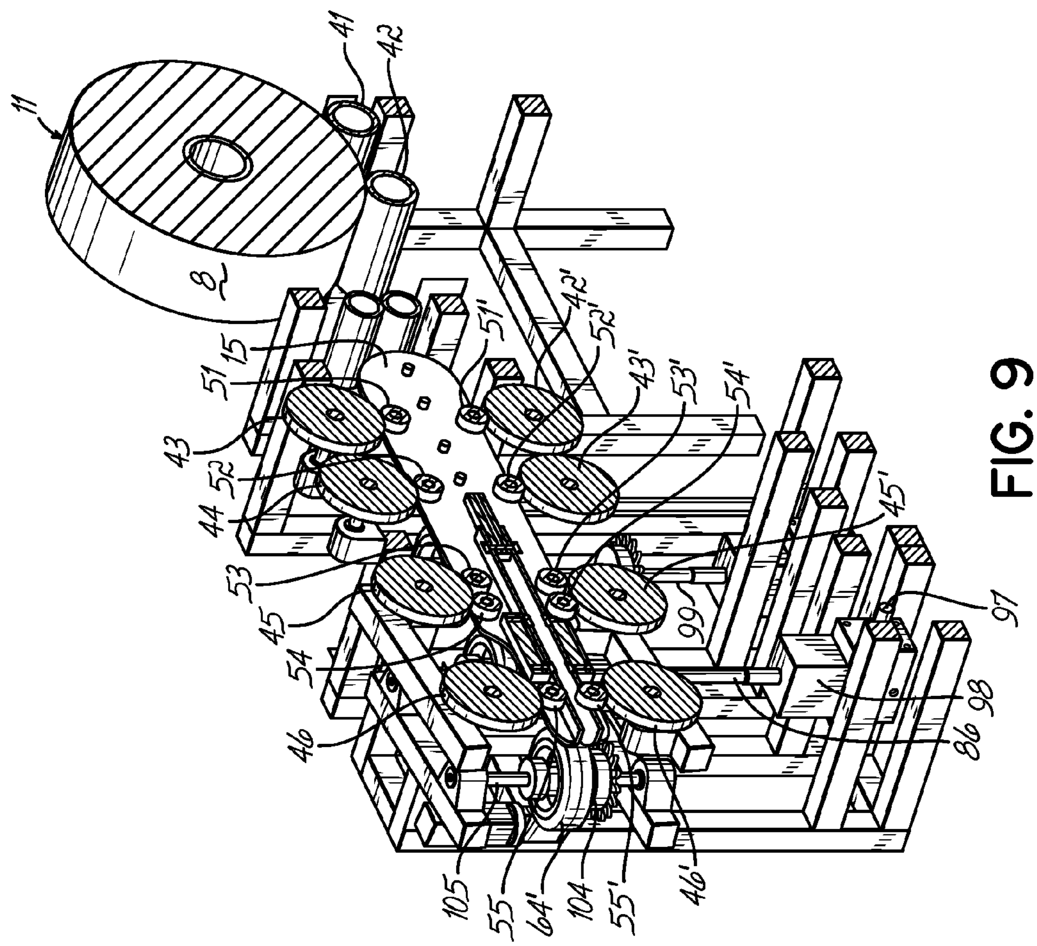
Figure 10:
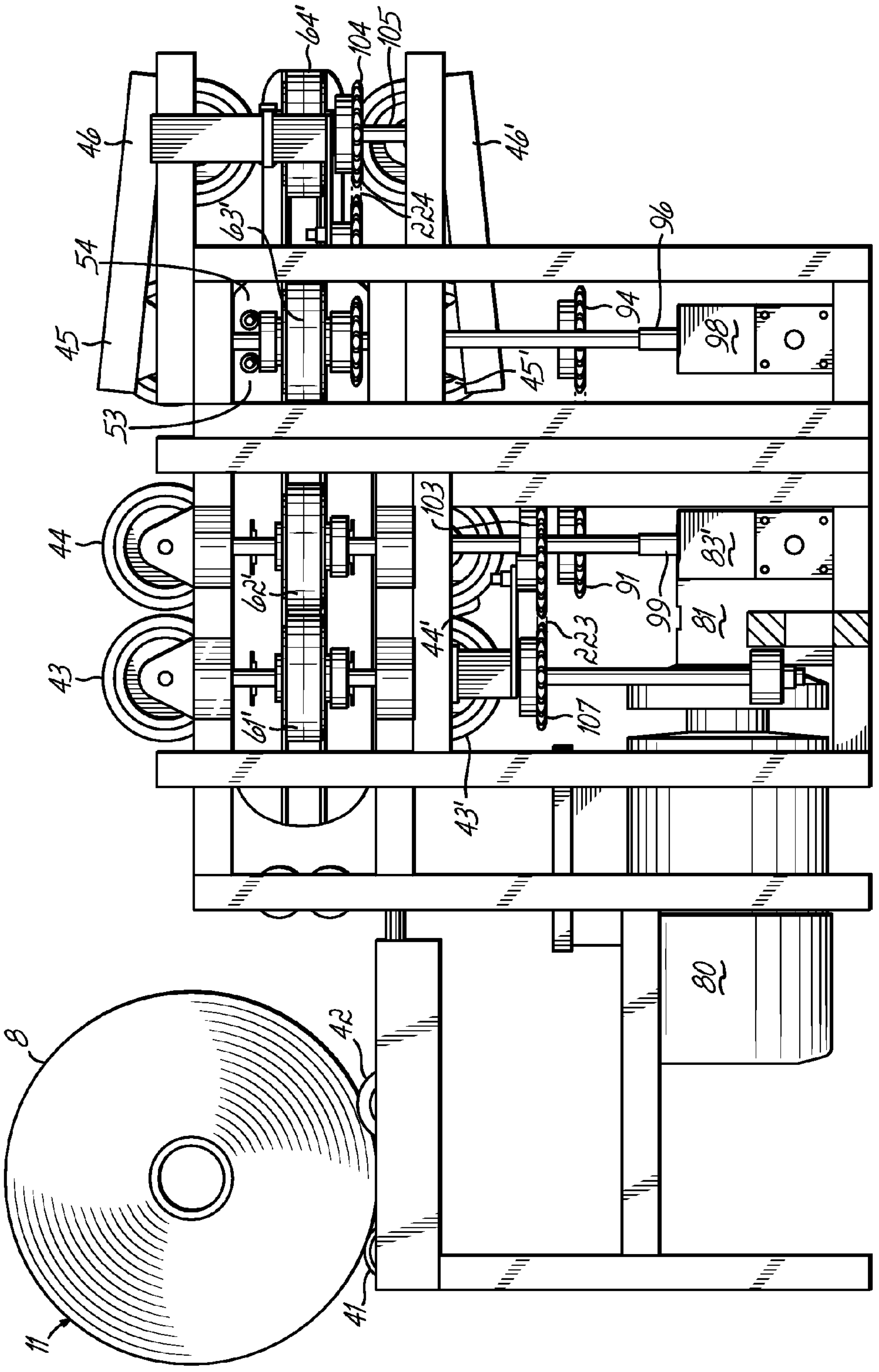
Figure 11:
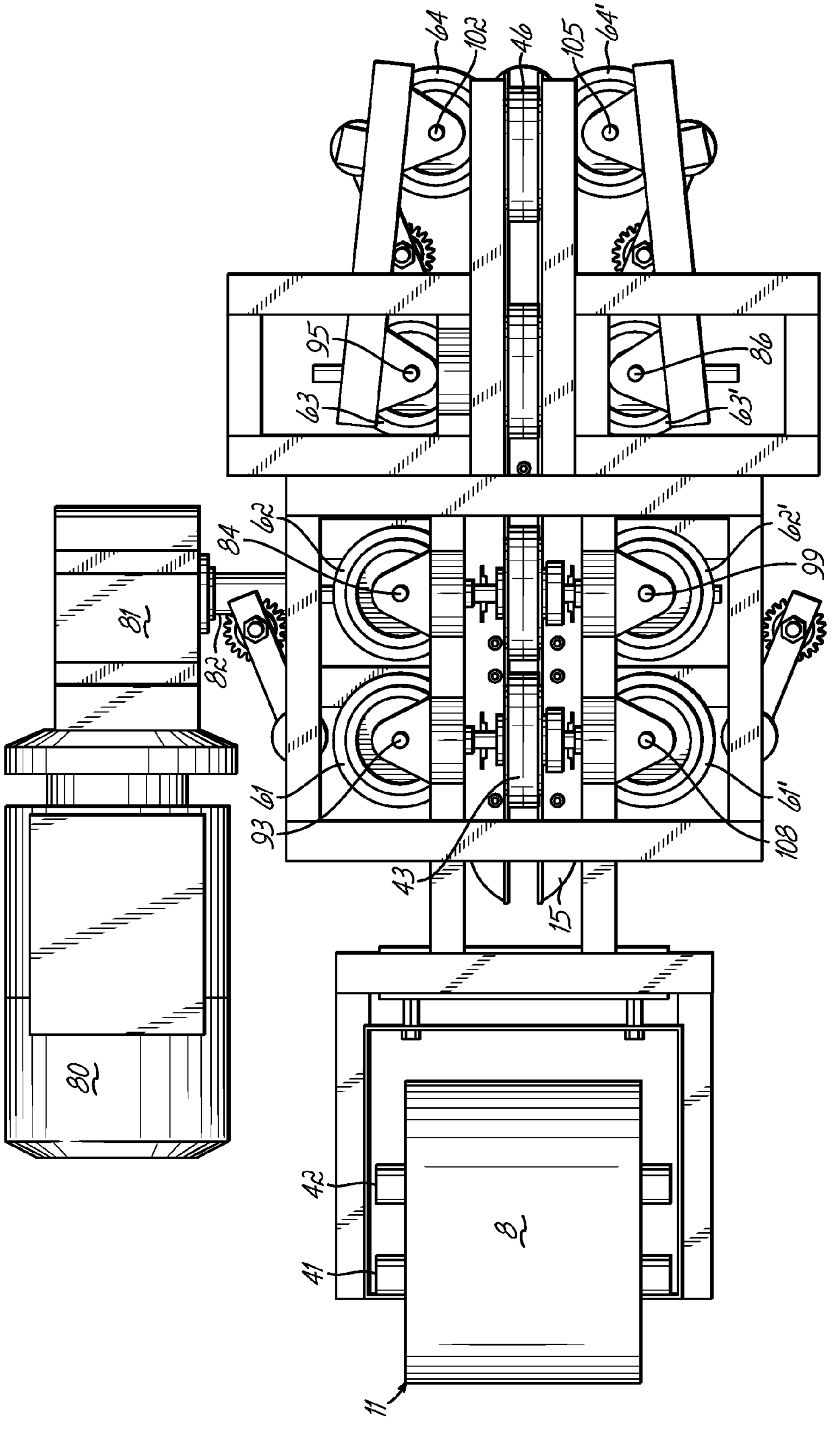
Figure 12:
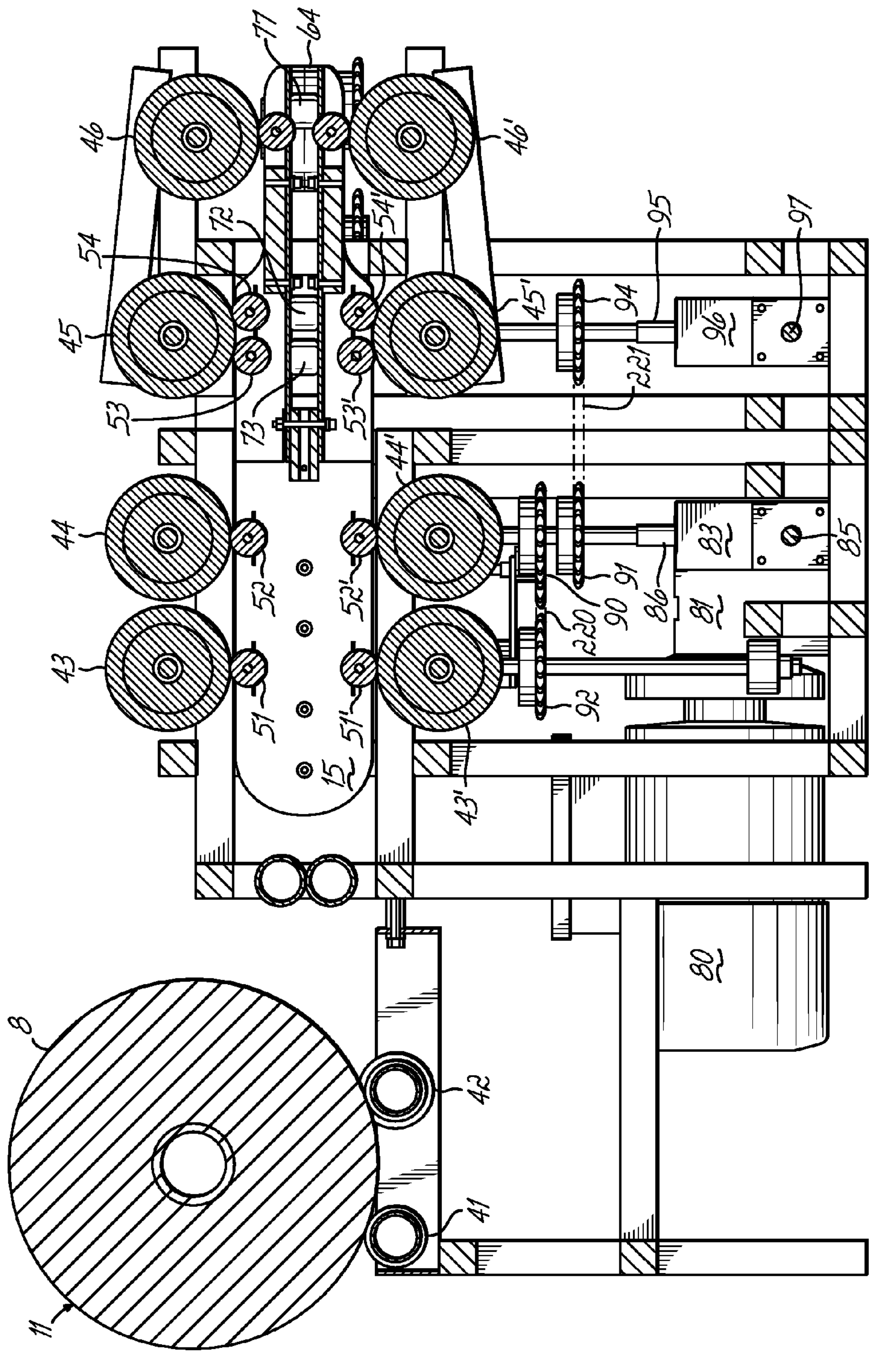
Figure 13:
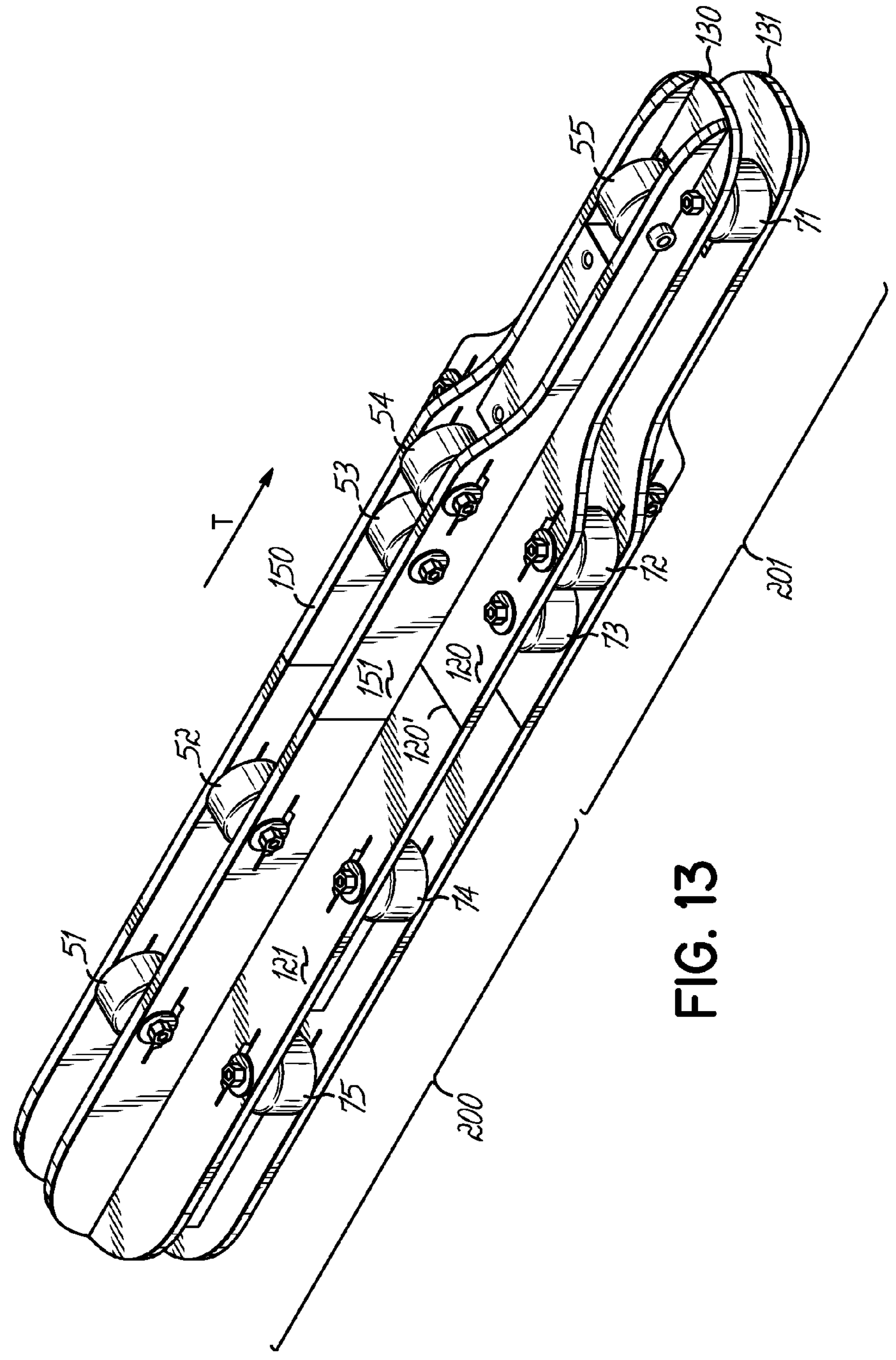
Figure 14:
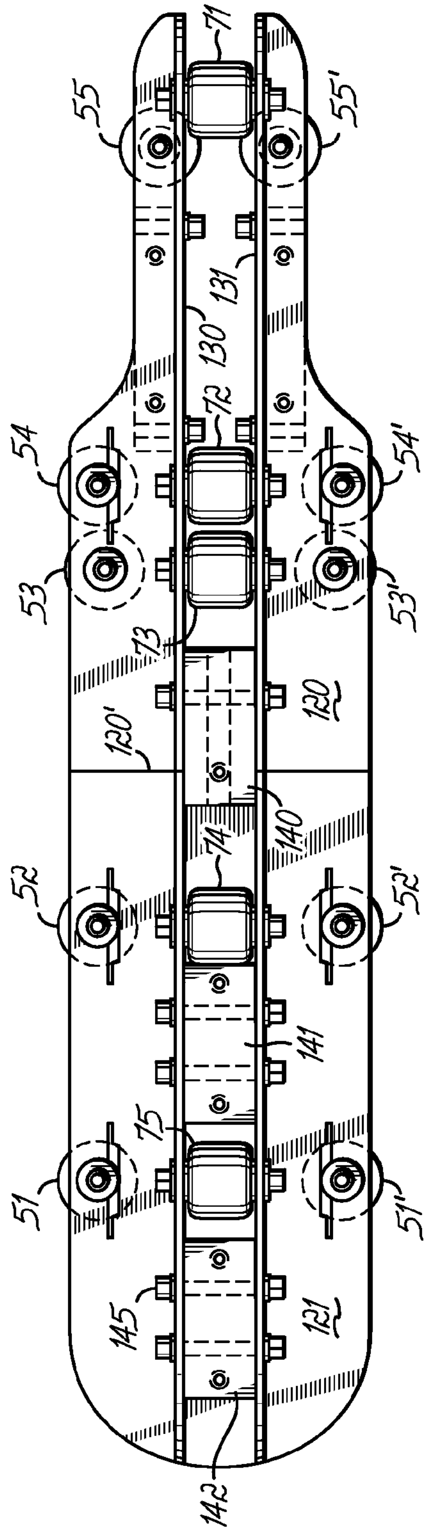
Figure 15:
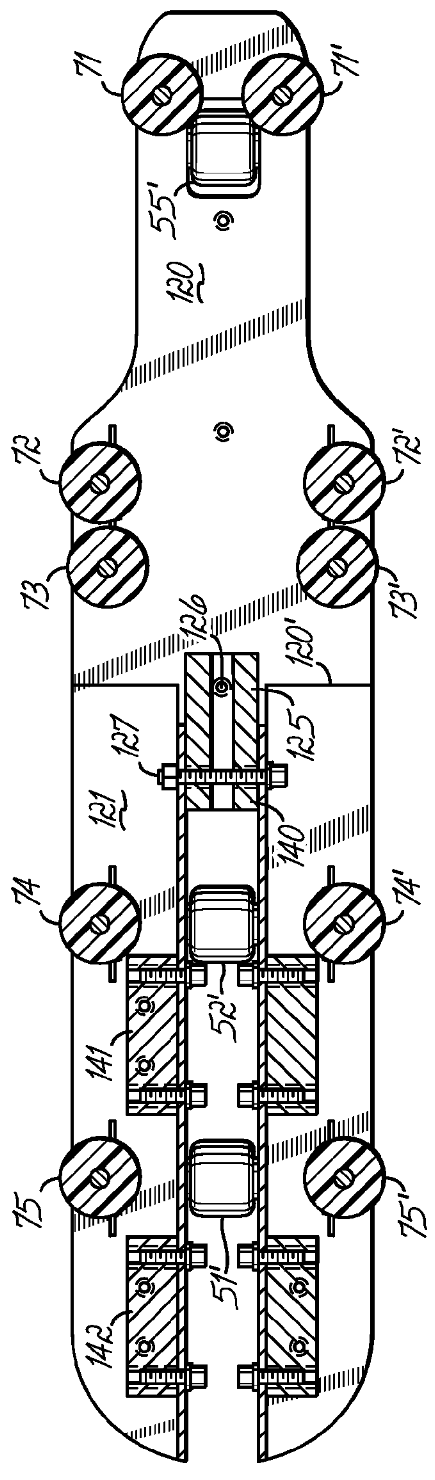
Figure 16:
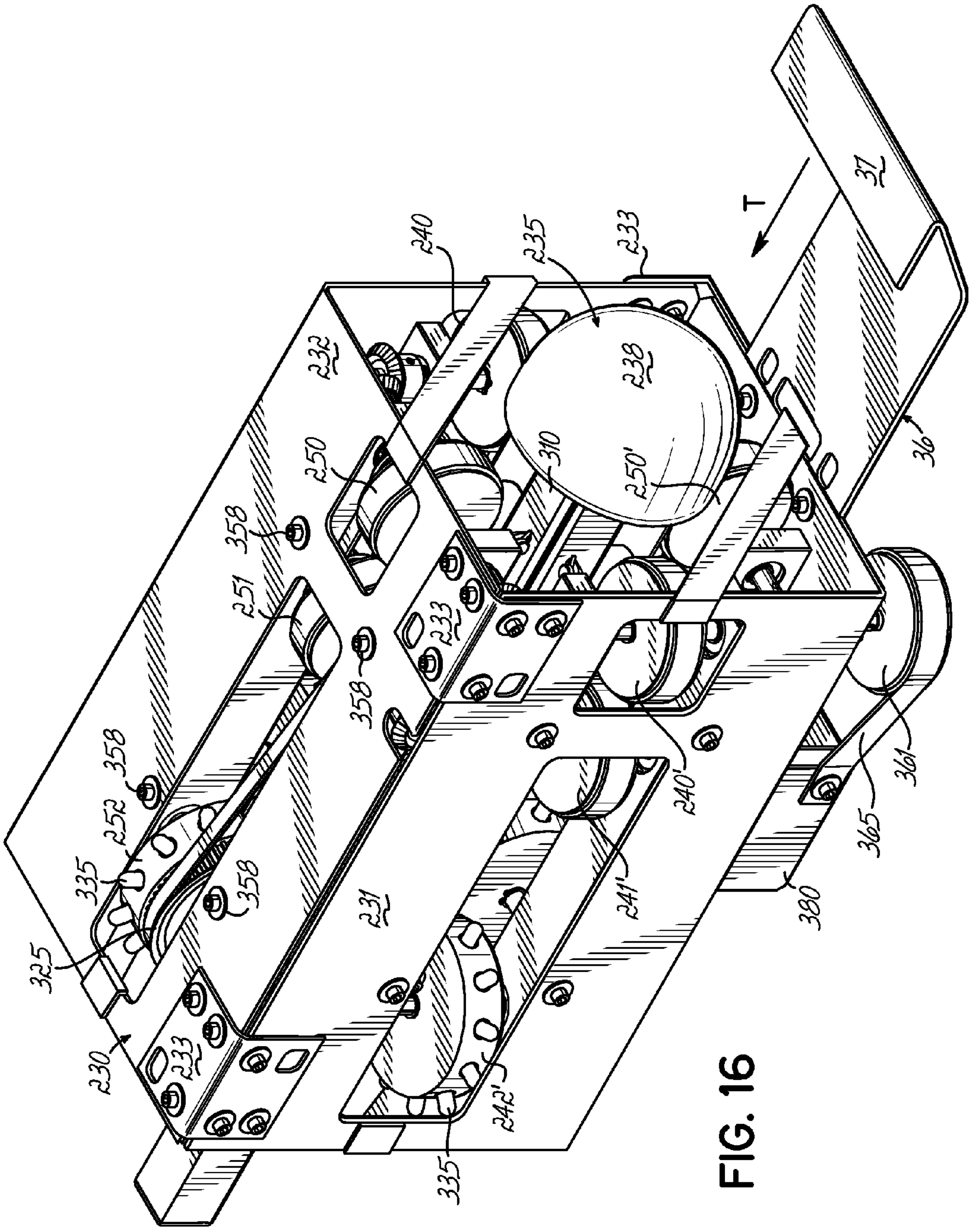
Figure 17:
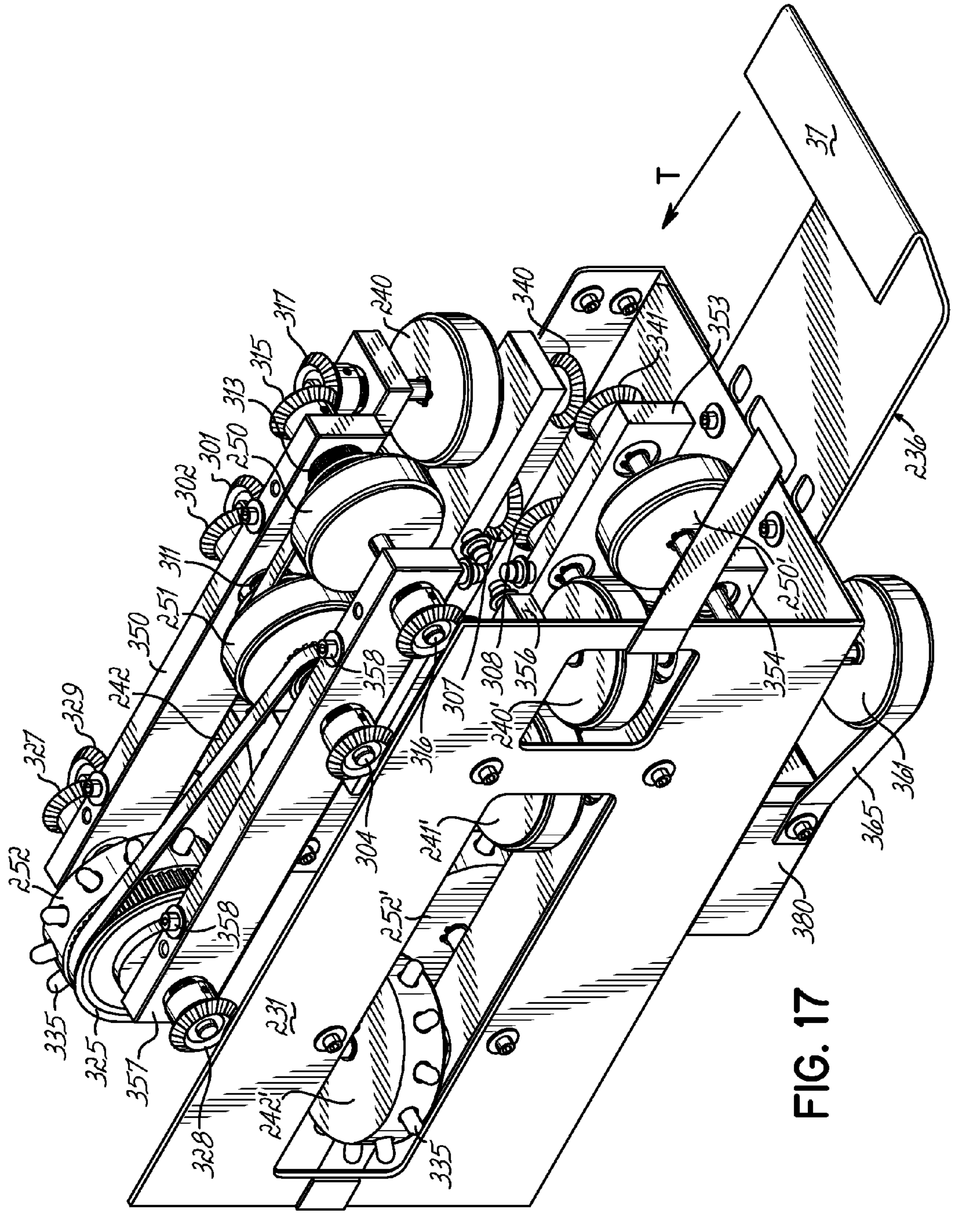
Figure 18:
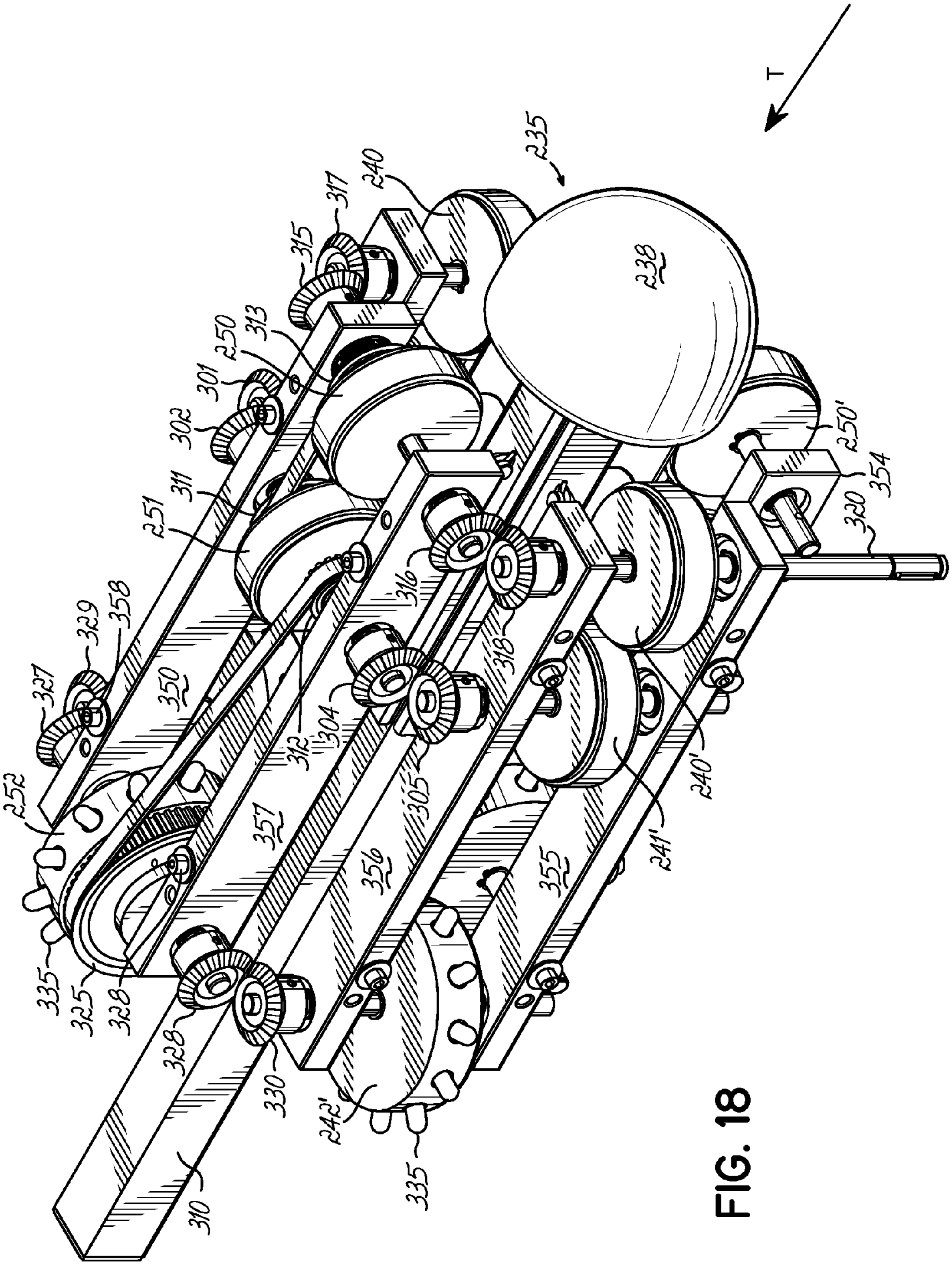
Figure 19:
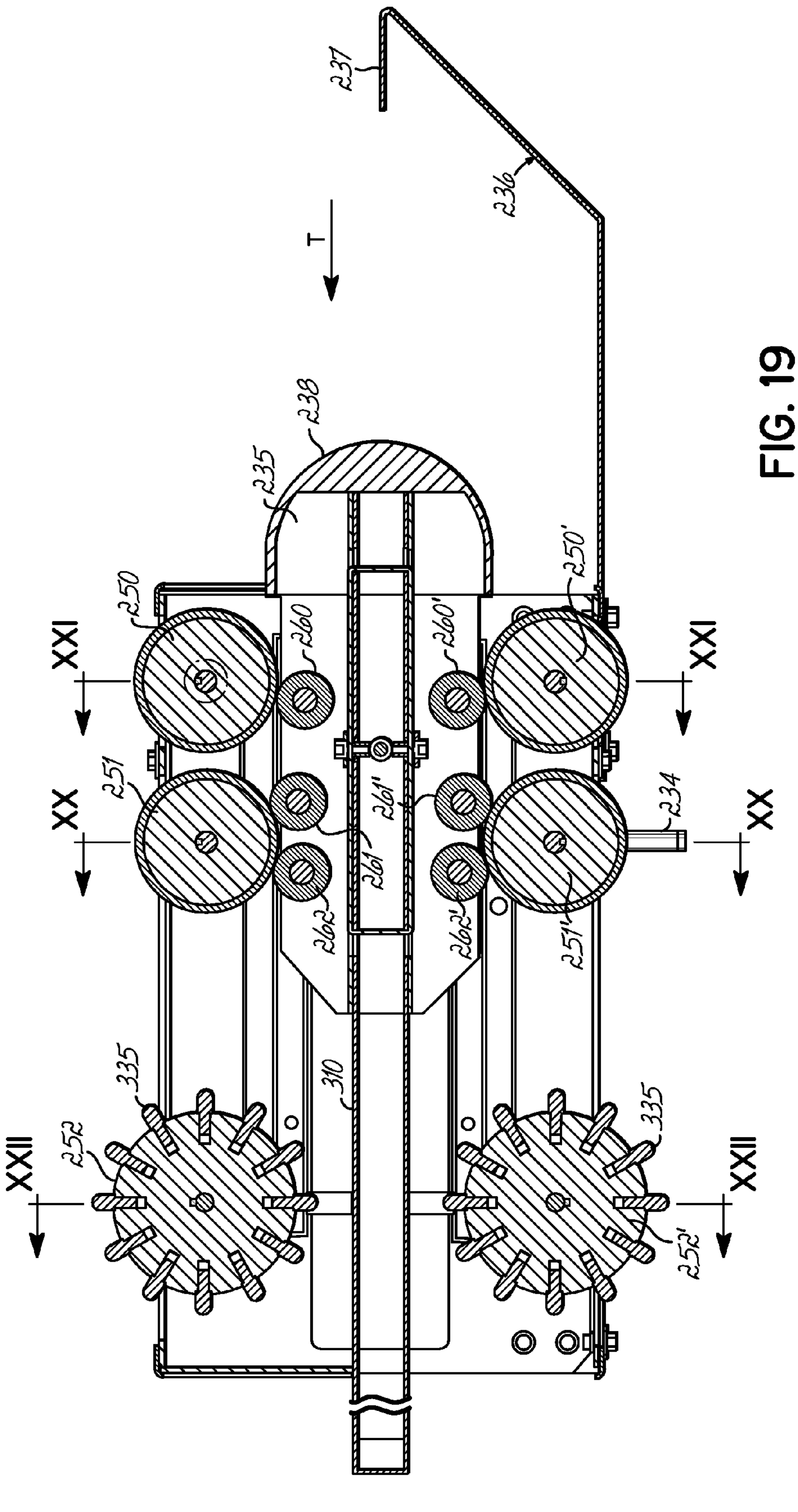
Figure 20:
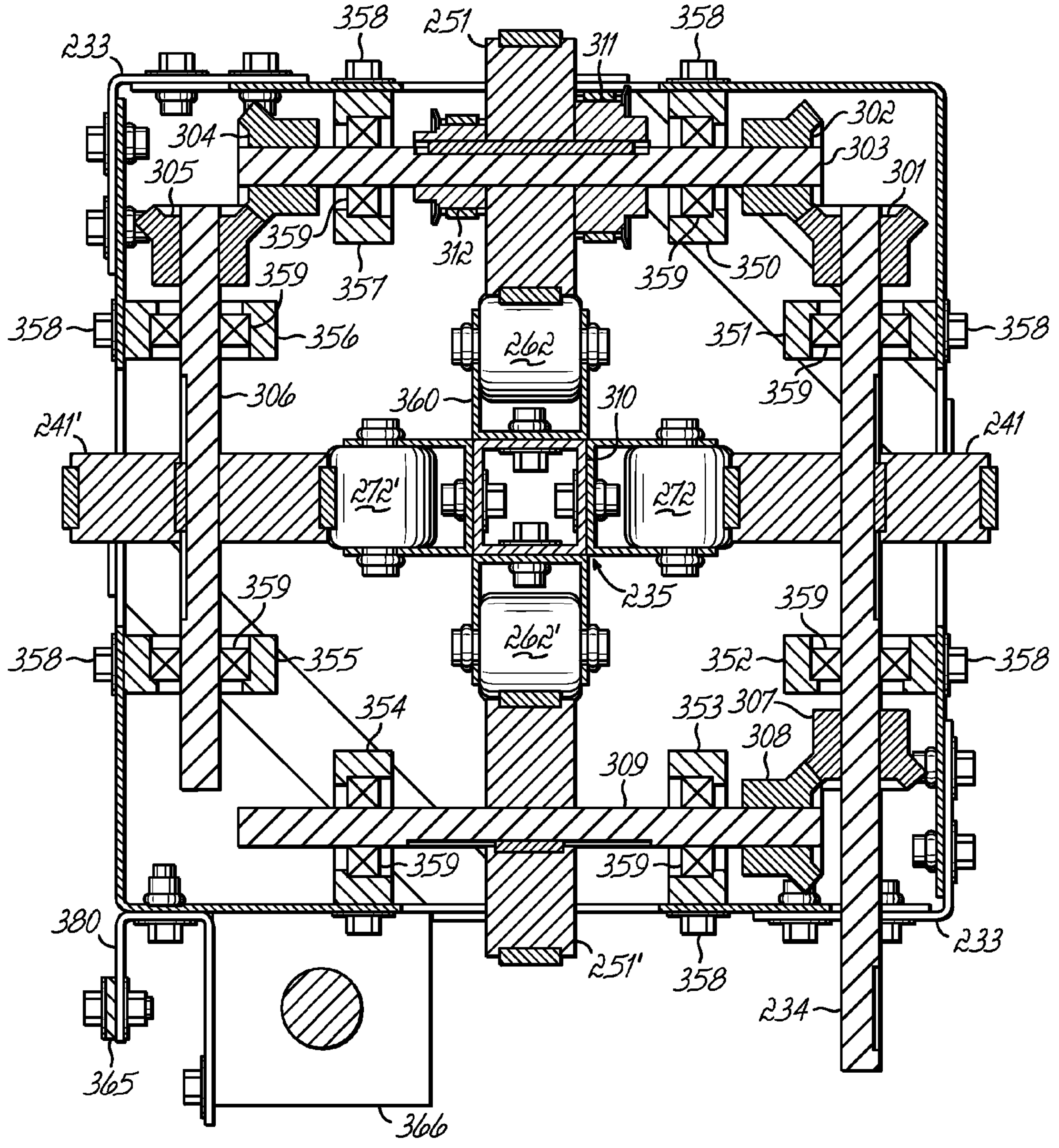
Figure 21:
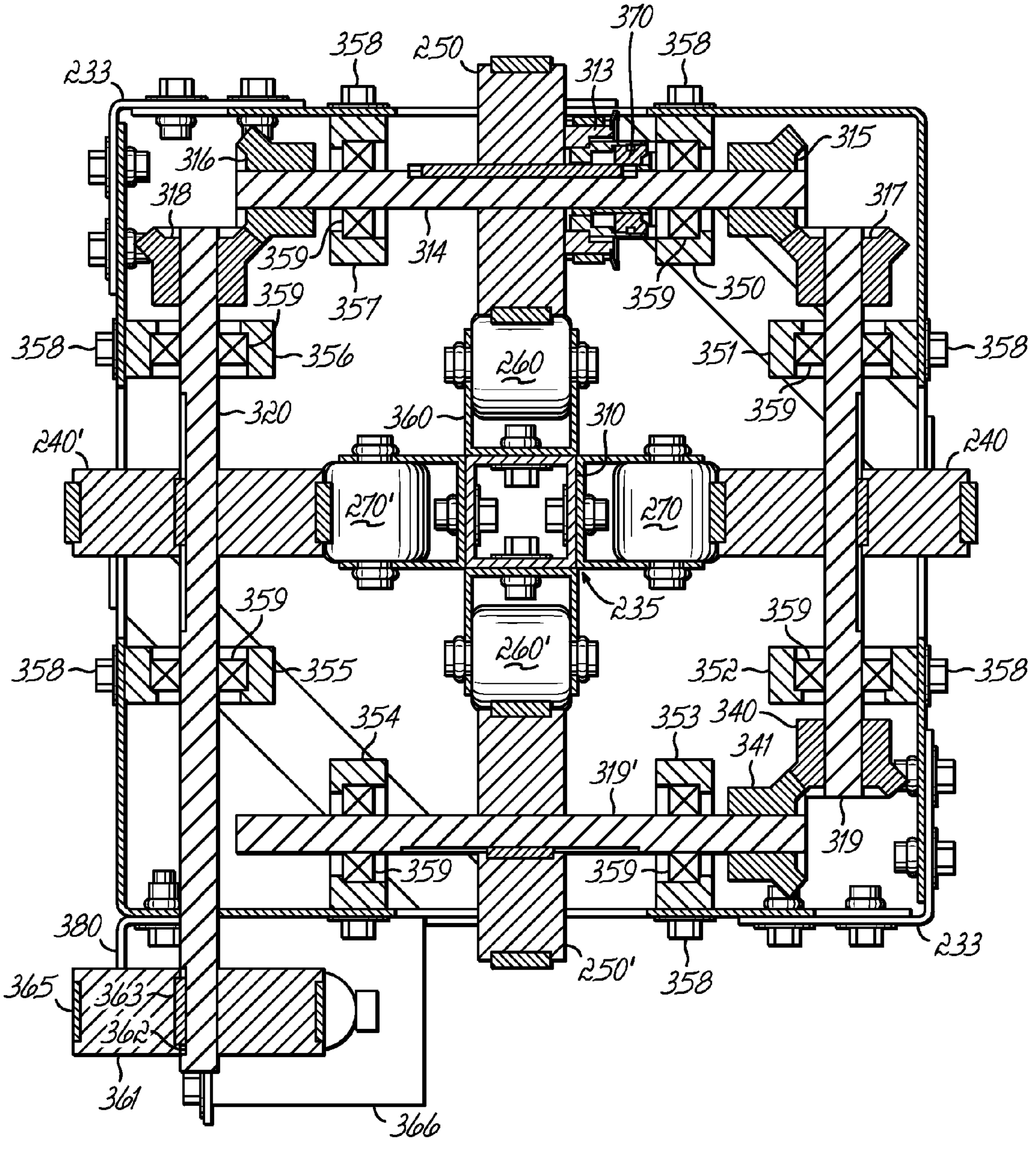
Figure 22:
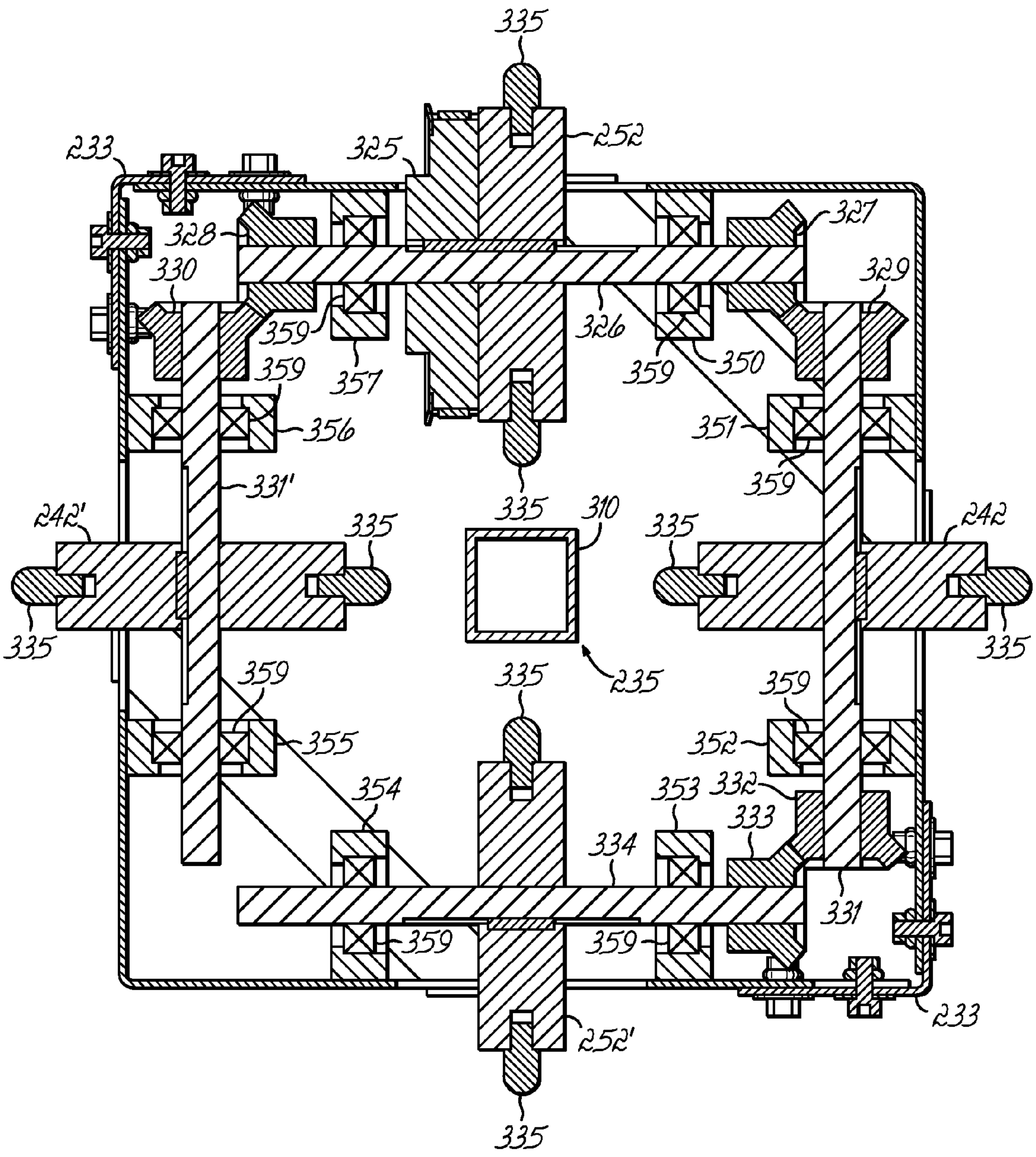
Figure 23:
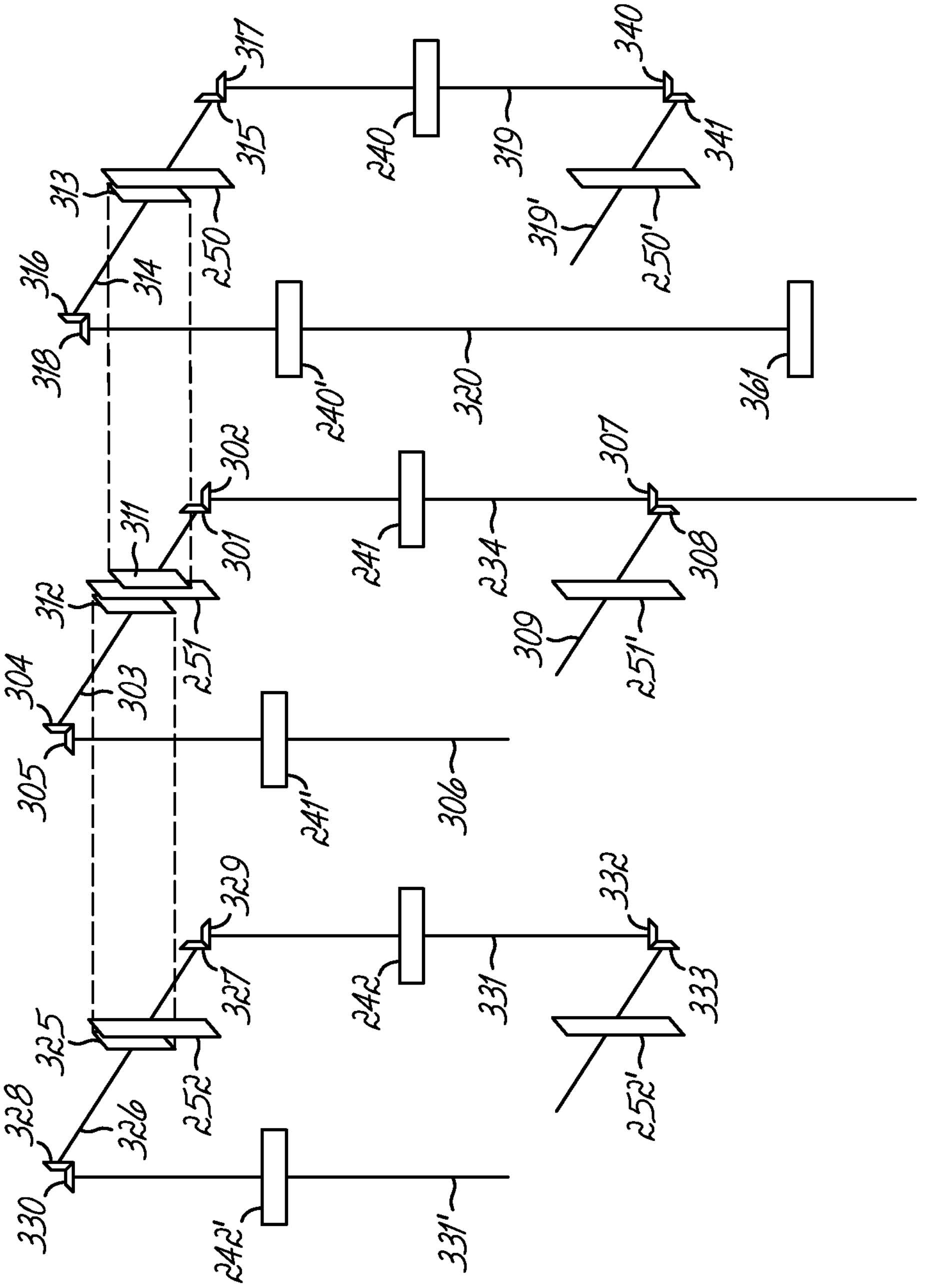
Figure 25:
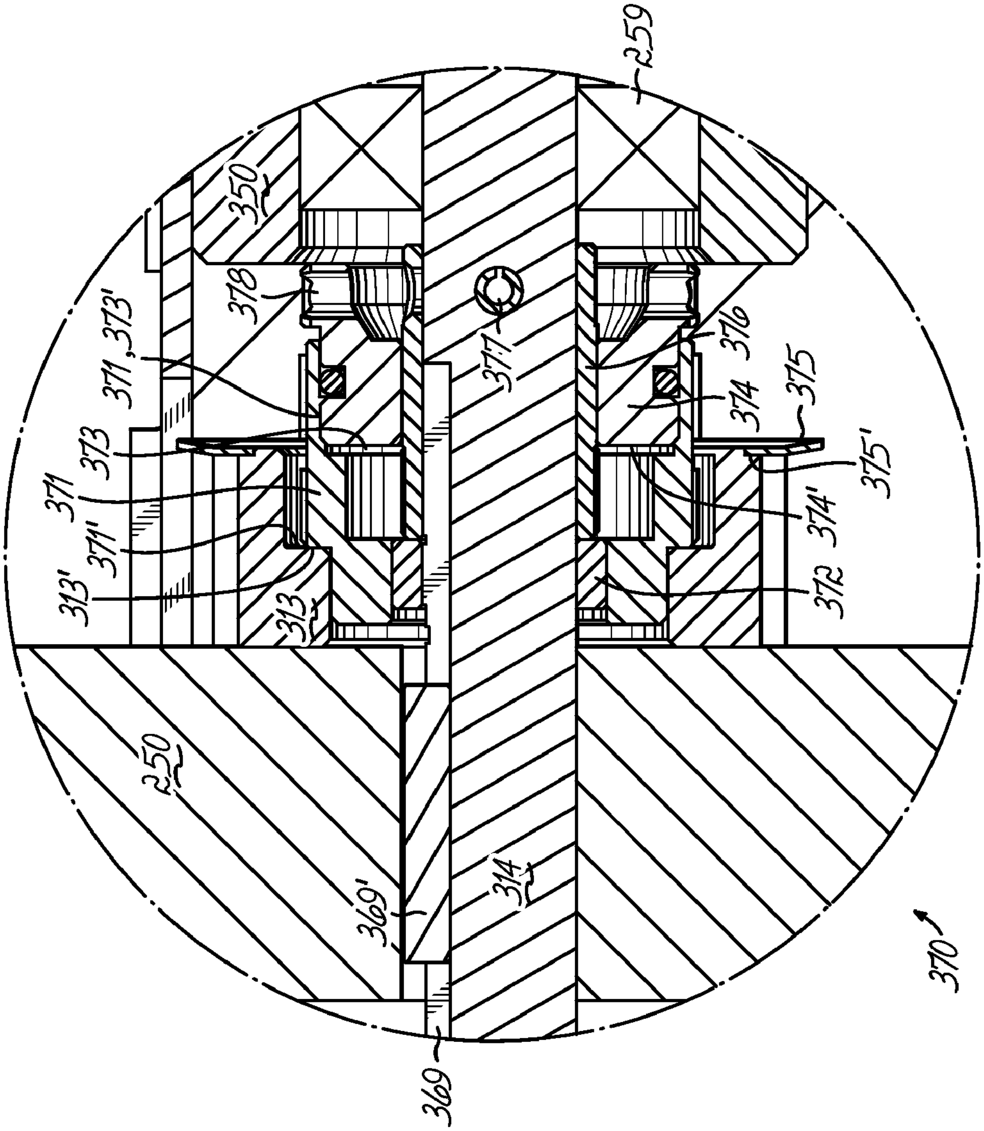
Figure 26:
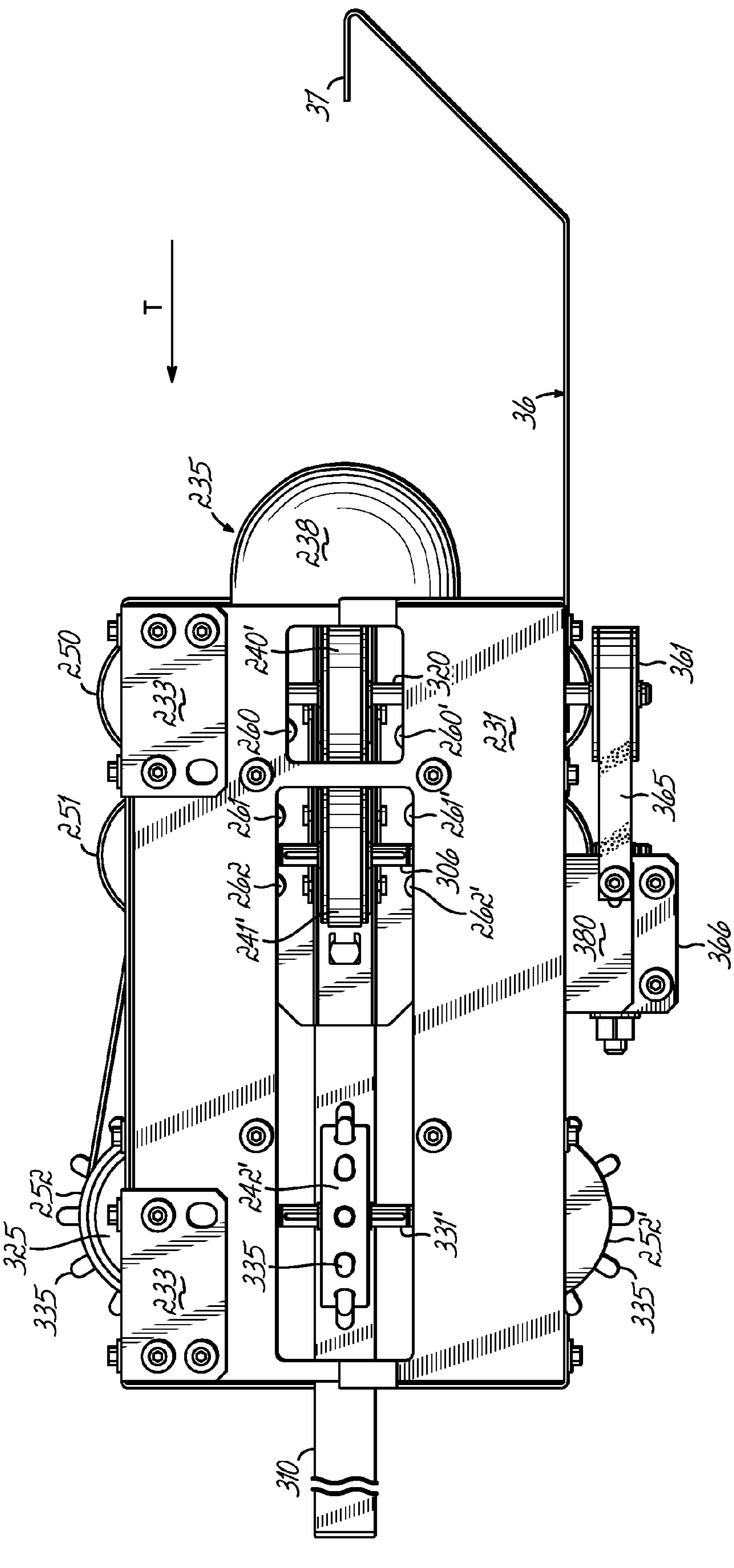

FIG. 1, an exemplary embodiment of a cushion;

FIG. 2, an exemplary embodiment of a paper tube from which by crumpling a cushion is created;

FIGS. 3(*a*) through (*f*), various schematic illustrations of cross sections of a paper tube;

FIG. 4, the schematic illustration of a paper web processing unit for producing a cushion;

FIG. 4*a*, the location of the axes of the rollers 16, 20, 21 relative to one another;

FIG. 5, a plan view on a paper tube web;

FIG. 6, a schematic illustration of a stand with a paper processing unit, as an apparatus for producing cushions;

FIG. 7, in perspective, a further exemplary embodiment of an apparatus for producing a cushion from a paper tube web;

FIG. 8, part of the apparatus of FIG. 7;

FIG. 8*a*, a schematic illustration of the drive of the rollers in FIG. 7;

FIG. 9, a cross section taken along the arrows IX-IX in FIG. 7;

FIG. 10, a side view of the apparatus of FIG. 7;

FIG. 11, a plan view of the apparatus of FIG. 7;

FIG. 12, a cross section taken along ling 12-12 through the apparatus of FIG. 7;

FIG. 13, a perspective view of the core;

FIG. 14, a side of the core of FIG. 13;

FIG. 15, a cross section taken along line 15-15 through the core of FIG. 13;

FIG. 16, a second exemplary embodiment (modular construction);

FIG. 17, the exemplary embodiment of FIG. 16, with half of the frame and the core removed;

FIG. 18, the exemplary embodiment of FIG. 16, with the core inserted and the entire frame removed;

FIG. 19, a section through the exemplary embodiment of FIG. 16;

FIG. 20, a section taken in the direction of the arrows XX-XX in FIG. 19;

FIG. 21, a section taken in the direction of the arrows XXI-XXI in FIG. 19;

FIG. 22, a section taken in the direction of the arrows XXII-XXII in FIG. 19;

FIG. 23, a schematic drive diagram for the outer rollers in the exemplary embodiment of FIGS. 16-22;

FIG. 24, a brake;

FIG. 25, a slip coupling;

FIG. 26, a side view of the apparatus of FIG. 16.

DETAILED DESCRIPTION OF THE INVENTION

FIG. 1 shows a crumpled cushion, or a crumpled cushion portion 1, having the length (in the crumpled state) a=approximately 28 cm, the inside diameter b=approximately 7 cm, and the outer diameter c=approximately 14 cm. It is understood that these figures are intended solely for purposes of illustration and are not to be understood as limiting. The cushion portion 1 is created by crumpling a prefabricated (configured) paper tube 2, specifically in the form of upsetting in the longitudinal direction (axial direction) with ensuing compression. One such paper tube 2 is shown in perspective in slightly opened form in FIG. 2, in terms of the cross section of FIG. 3(*a*). It involves a paper web 6, which is folded as shown, that is, with two lateral indented folds 2'. The folded paper web has a portion 3, at which the two edges 4', 4" overlap and are glued to one another by means of an adhesive layer 7. Other possible cross sections of the paper tube 2 are shown in FIGS. 3(*b*), (*c*), (*d*), and (*e*), and in FIG. 3(*c*), (*d*), (*e*), strips 5 are shown with which the edges of the folded paper web 6, or of two parallel paper webs 6', 6" are joined or glued together. In this prepared form, the term used is also a configured paper web, or a paper tube web 8. FIG. 3(*f*) illustrates another possible cross section of paper tube 2 wherein two parallel paper webs 6', 6" are joined or glued together via adhesive layers 7, 7 between their confronting lateral edges.

The paper is preferably so-called "kraft paper", that is, very firm, brown packing paper made of unbleached sulfate cellulose, usually using very long fibers, which is therefore especially tear-resistant. It is understood that this statement should again be understood only as an example. The webs are glued together, as already mentioned. The adhesive layers 7 that are striplike in the longitudinal direction of the cushion portion form, optionally together with the strip 5, an additional reinforcement of the cushion, which enhances the cushioning properties.

FIG. 4 shows one basic embodiment of a paper processing unit 35 for creating a cushion 1. A roll 11 is seated on a shaft 10. The roll is formed by a configured, wound-up paper tube web 8. This tube is drawn onto a core 15 by two pairs of driven rollers 16 and kept on hand there. One pair of rollers 16 can be seen; a further pair is located perpendicularly before and behind the plane of FIG. 4, in the same vertical plane. The rollers 16 are followed by rollers 17, which are driven at a somewhat lower speed, so that between the two creasing 8' ensues from upsetting, and upon passage through the paper tube web 8 between the rollers 17 and the core, this creasing undergoes crumpling. Two further rollers 17 are disposed in the same vertical plane, in FIG. 4 in front of and behind the core 15, with their axes perpendicular to those of the rollers 17 shown. Pairs of rollers 20, 21, 22, 23, 24 that freely travel jointly are disposed on the core 15 and serve to provide for low-friction travel along the paper tube on the outside of the core. As shown in FIG. 4*a*, the rollers 16 plunge by an amount h (plunging depth) between the rollers 20, 21, so that they secure the core 15, in a defined position, against axial displacement.

One possibility for cutting off individual cushion portions from the continuously manufactured band is seen in FIG. 5. Once again, a paper tube web 8 is shown in plan view that has perforation lines 12, or tearing points or lines of separation, at intervals of 80 cm, for instance. Along these lines, for instance at the spacing of half the width of the paper tube web, rhomboid cutouts 13 are provided. If the rollers 16 are now stopped at predetermined time intervals, which correspond to the processing of a particular longitudinal portion, and the rollers 17 are allowed to continue to rotate, then along the perforated line that Is then located between the rollers 16 and 17, one cushion portion 1 is torn off. The tearing off can also be done by other means in the transport direction T, before or after the apparatus shown. Separating the cushion portions can naturally also be done by a cutting device or other separating devices as well.

One simple design of a stand with a paper processing unit 35 for producing such a cushion portion is shown in FIG. 6.

The stand for the various components comprises a bottom plate and scaffold 31, which has rolls 32 and 33 onto which configured paper tube webs 8 are wound. The upper roll 32 is the one from which a paper tube web 8 is just now being drawn off and processed. Roll 33 is a reserve roll. On the upper end of the scaffold 31, by means of rail 37, slot 36 and locking screw 39, the processing unit 35 is disposed so as to be adjustable in height. The equipment can move from place to place by means of rollers 38. The mounting of the two rolls 32 and 33 is done without shafts on further rolls (not shown.

FIGS. 7-12 show one exemplary embodiment of an apparatus for producing a cushion portion 1 in more detail.

In FIG. 7, a stand 40 can be seen, on the right-hand side of which two rollers 41 and 42 are provided, on which a roll 11 of a paper tube web 8 is disposed without a shaft.

As best seen from FIG. 8, outside the core 15 and therefore hereinafter also known as "outer rollers", four upper rolls 43, 44, 45, 46 and pairs of associated lower rollers 43', 44', 45', 46' can be seen. Transversely to this, but with axes in the same vertical plane and also facing one another in pairs, further pairs of rollers 61, 61', 62, 62', 63, 63', 64, 64' are provided (see also FIG. 11). These pairs of rollers cooperate with rollers that rotate freely on the core 15, namely the pair of rollers 51, 51', the pair 52, 52', the two pairs of rollers 53, 53' and 54, 54', and the pair 55, 55'. Among the "inner rollers"

there are also further pairs, which are disposed with their axes perpendicular to the axes of the aforementioned rollers, but in the same vertical plane (in this exemplary embodiment), that is, the pairs of rollers 71, 71', 72, 72' 73, 73', 74, 74', 75, 75' (see also FIGS. 12 and 14).

The cooperation of only one of the outer pairs of rollers, namely of the outer pairs of rollers 45, 45' and 63, 63' with each of the two pairs of rollers 53, 53' and 54, 54' spaced apart from one another on the core 15, secures the core 15 against an axial displacement, despite its being freely supported; in this respect, see also the explanation above for FIG. 4*a*. Since the outer rollers are driven and are in engagement with the inner rollers, the paper tube web 8 is thus drawn through between the outer and inner rollers and, as a consequence of different drive speeds of the outer rollers, is folded between them and then crumpled.

The drawing in of the paper tube web is effected by the two pairs of rollers 61, 61' and 43, 43' facing one another, while the emergence of the upset roll is effected by the pairs of rollers 64, 64' and 46, 46'.

For driving the "outer roller", a central electrical drive motor 80 is provided, to which a gear 81 for stepping down the rotary speed is flanged. The power takeoff shaft 82 is connected to the gear 83, which in turn first drives the shaft 84, deflected by 90°, and second drives the shaft 85, which in turn, deflected by 90°, in the gear 83', drives the shaft 99. The gear wheels 90 and 91 are seated on the shaft 84. The gear wheel 90 drives the gear wheel 92 on the shaft 93 via a chain 220 and gear wheel 91 and drives the gear wheel 94 on the shaft 95 via chain 221. The shaft 95 extends from the top inward into the gear 96, which deflected by 90° drives the shaft 97, which extends into the gear 98, which deflected by 90° drives the shaft 86 and thus the roller 63'. Also seated on the shaft 95 is a gear wheel 100, which via a chain 222 drives the gear wheel 101 and thus the shaft 102, on which the roller 64 is seated. The shaft 99 likewise drives a gear wheel 103 (see FIG. 8*a*), which via a chain 223 drives the gear wheel 107 and thus the shaft 108 and thus also the roller 61'. The rollers disposed perpendicularly move freely in part. The roller 44 on shaft 109' is coupled to the shaft 84 via a bevel gear connection 109. It is understood that pulleys may be used instead of the chains. In this way, it is possible to make do with only one motor.

By means of different gear ratios from the shaft 82 to the shaft 85 on the one hand (gear 83) and shaft 84 to shaft 95 on the other (gear wheels 91, 94), it is attained that the rollers 61, 61', 62, 62' located in the vicinity of the drawing-in region, that is, to the right in FIG. 8, travel somewhat faster than the rollers 63, 63', 64, 64' downstream of them in the transport direction, so that the aforementioned creasing 8' can occur.

Groups of rollers are described herein. In the exemplary embodiment of FIGS. 1-5, the first group is formed by those rollers whose axes are located (see FIG. 12) in the vertical planes A and B (in terms of the exemplary embodiment of FIGS. 8-12, that is, perpendicular to the transport direction T of the paper tube). The second group of rollers is formed by those rollers that are located in the vertical planes C. The third group forms the rollers in the plane D.

| Group | Vertical Plane | On the core 15: "Inner Rollers" | On the apparatus outside the core 15: "Outer Rollers" |
|---|---|---|---|
| First | A | 51, 75, 51', 75' | 43, 61, 43', 61' |
| | B | 52, 74, 52', 74' | 44, 62, 44', 62' |

-continued

| Group | Vertical Plane | On the core 15: "Inner Rollers" | On the apparatus outside the core 15: "Outer Rollers" |
|---|---|---|---|
| Second | C | 53/54, 72/73, 53'/54', 72'/73' | 45, 63, 45', 63' |
| Third | D | 55, 71, 55', 71' | 46, 64, 46', 64' |

Each two inner rollers (such as 53/54) that are associated with an outer roller (such as 51) and are associated with one another by the symbol "/" have a certain spacing from the plane C shown in FIG. 12, but this spacing is not critical in the present situation. They cooperate with a third roller and serve to fix the core 15 in the axial direction (see the explanation above for FIG. 4*a*).

The rollers of the first group travel at a "first" circumferential speed, and the rollers of the second group travel at a "second" circumferential speed that is less than the first circumferential speed. The result is a crease (see 8' in FIG. 4), which upon passage through the second group is also crumpled.

Upon passage through the rollers of the third group in plane D, crumpling occurs again, specifically as a consequence of the lesser diameter of the core 15 at this point, including in the radial direction. This radial decrease in diameter takes place at the transition of the paper tube from the portion 200 to the portion 201 (see FIG. 13). The term "diameter" is not meant to be understood strictly here but instead pertains to the approximate outline around the plates 130, 131, 150, 151 at the applicable point. Accordingly, compressive crumpling of the paper tube takes place in the axial direction and in the radial direction, the latter taking place in/after the diameter reduction of the core and thus of the paper tube.

In FIGS. 13-15, the construction of the core 15 in detail.

As seen in FIG. 13 and FIG. 14, the core 15 is constructed of two parts, namely a front part 120 in terms of the transport direction and a rear part 121 in terms of the transport direction. The dividing line is marked 120'. The two parts are joined together, in this specific case in that the front part has a connecting element 125, which is connected on the one hand to the front part 120 by means of the screw 126 and on the other to the rear part 121 by means of the screw 127.

If the two parts are viewed together in the assembled state (see FIG. 14), it can be seen that the core 15 substantially comprises an upper plate 130 and a lower plate 131, which are joined to one another, via spacers 140, 141, 142 that are disposed between them, by means of screws 145. The rollers 71'-75' (and behind them and therefore not visible, the rollers 71-75) are then disposed between the plates.

Both on the upper plate 130 and on the lower plate 131, two further plates 150, 151 each are disposed continuously (but in two parts, corresponding to the front part 120 and the rear part 121), these further plates being parallel and perpendicular to the plates 130, 131; these further plates serve to support the rollers 51-54, that is, on the underside 51'-55'.

FIG. 16 shows a further exemplary embodiment of modular construction, in which all the rollers are disposed inside a boxlike frame 230, which comprises two frame portions 231 and 232, bent at right angles, which are screwed to another by means of the angle brackets 233. The shaft 234 protrudes from the frame 230 at the bottom. It corresponds to the shaft 84 in FIG. 8 and FIG. 8*a* and is connected to a drive motor, not shown in FIG. 16. Within the module, the core is also fixed in the axial direction between the rollers. A guide baffle 236 that is adjustable by means of screws is disposed on the frame, and the paper tube web 8 can be delivered via its guide face 237.

The paper tube web is drawn across the mushroom-shaped inlet head 238 and opened out in the process and pulled through between the rollers.

As seen from FIGS. 20 and 23, the shaft 234 carries the outer roller 241 and, via the two bevel gears 301 and 302, drives the shaft 303 and thus also the roller 251. The shaft 303, via the bevel gears 304, 305, then drives the shaft 306 and thus also the roller 241'. The shaft 234 moreover, via the bevel gear 307 and the bevel gear 308, drives the shaft 309, on which the roller 251 is seated. The rollers 241, 241', 251, 251' cooperate in such a manner with rollers 261, 261', 262, 262', 271, 271', 272, 272', disposed freely rotatably on the internal tube 310, which is part of the core 235, that when the shaft 234 is driven, a paper tube web 8 is pulled through, between the outer rollers and the inner rollers. The rollers 261, 261', 271, 271' are seated perpendicular to the plane of FIG. 20 just before the rollers 262, 262', 271, 271' (see FIG. 19 and FIG. 26). The two "inner rollers" disposed in pairs before and behind the plane in FIG. 20 cooperate with the "outer rollers" in order to axially fix the core.

Seated on the shaft 303 (FIG. 20) on one side (to the right) of the roller 251 is the gear wheel 311, and on the other is the gear wheel 312.

The gear wheel 311, via a chain or pulley (not shown), drives the gear wheel 313 on the shaft 314 (see FIG. 21). The shaft 314 carries the bevel gears 315 and 316, which via the bevel gears 317 and 318 drive the shafts 319 and 320. In this way, the rollers 240, 240', 250, 250' seated on these shafts are driven, and in turn cooperate with the rollers 260, 260', 270, 270' in such a way that between a paper tube web 8 can be drawn in and pulled through.

The gear wheel 312 (FIG. 20), via a chain or a pulley (not shown), drives the gear wheel 325 (see FIG. 22), on which the shaft 326 that carries the roller 252 is seated. Via the bevel gears 327, 328, 329, 330, the shaft 326 drives the shafts 331 and 331' and thus the rollers 242, 242' seated on them. Seated on the lower end of the shaft 331 is a bevel gear 332, which drives a bevel gear 333. The latter drives the shaft 334 and thus the roller 252'.

In this exemplary embodiment, the rollers 242, 242', 252, 252' ("outer rollers") are not assigned any corresponding rollers, cooperating with them, on the core or on the internal tube 310. To bring about the crumpling of the tube passing between these rollers on the one hand and the internal tube 310 on the other and already crumpled and now radially compressed, and to improve this crumpling and at the same time to reinforce the feeding of the tube in the transport direction T, the rollers 242, 242', 252, 252' have pins 335 distributed at regular intervals along their circumference.

The shafts are each in bearings 359 that are provided in gibs 350-357 (see FIG. 17). The gibs are screwed to the frame portions 231 and 232, for example by means of the screws 358 (see FIG. 16).

Thus a paper web tube 8 is drawn manually onto the core 235 in the transport direction T at the beginning of the procedure, placed between the rollers 250, 250', 240, 240' (outer rollers) and the rollers 260, 260', 270, 270' (inner rollers), and as soon as these rollers engage it, it is drawn by them continuously between them and pulled through between them, because of the fact that the outer rollers are driven as described. Next, they are pulled through between the rollers 251, 251', 241, 241' (outer rollers) and the rollers 261, 261', 262, 262', 271, 271', 272, 272' (inner rollers), but at a lower speed. Accordingly what occurs between these two groups of rollers is a creasing, which is not shown in these drawings, but can be seen in FIG. 4 (at 8*a*). The first group is formed by the outer rollers 240, 240', 250, 250' and the inner rollers 260, 260', 270, 270'. The second group is formed by the outer rollers 241, 241', 251, 251' and the inner rollers 261, 261', 262, 262', 271, 271', 272, 272'. To make it possible for the creasing to occur, however, the diameter of the paper web tube must be correspondingly greater than that of the core.

The different speeds of the first and second groups of rollers is due to the fact that the gear ratio of the gear wheel 311 (FIG. 20) to the gear wheel 313 is designed accordingly.

A further crumpling then takes place upon the reduction in the radial spacing (relative to the center line of the internal tube 310) of the paper web tube as it is transported from this second group of rollers to the third group of rollers, formed by the rollers 242, 242', 252, 252'. These are "outer rollers". This exemplary embodiment does not have any "inner rollers" corresponding to outer rollers 242, 242', 252, 252'. Nevertheless, further crumpling occurs. The speed of revolution of this third group of rollers is determined by the gear ratio of gear wheel 312 (FIG. 20) to gear wheel 325 (FIG. 22).

It should furthermore be noted that the inner rollers are supported on the internal tube 310 because suitably U-shaped bearing brackets 360 are screwed onto the internal tube (FIGS. 20, 21).

Figure 24:
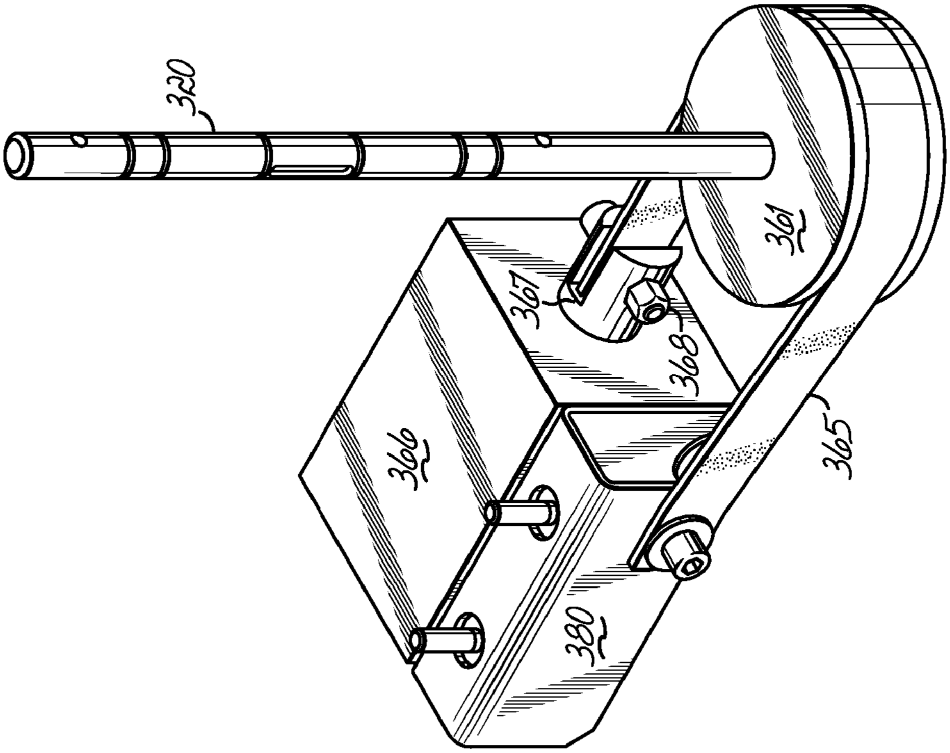

To brake outer rollers of the first group of rollers, or—more precisely—the driven outer rollers 240, 240', 250, 250' (see FIG. 21), in order to bring about tearing off of the paper web tube at the "intended tearing points" 9/9' (see FIG. 5), the following provisions are made: A brake wheel 361, fixed in a groove 363 by a tongue 362, is disposed on the shaft 320 (FIG. 21). The brake wheel 361 can, as seen from FIG. 24, be brought to a standstill by a brake belt 365, when the electric motor 366 is excited. Then the armature 367, on which the retaining rod 368 is secured with the brake belt 365, is drawn inward by approximately 2 mm in the direction of the arrow. This tenses the brake belt 365 and stops the motion of the shaft 320. As a consequence of the geared connection via bevel gears and shafts, this stop then causes a corresponding stop of the outer rollers 240, 240', 250, 250' shown in FIG. 21.

So that despite the aforementioned stop, the driven rollers 241, 241', 251, 251' (FIG. 20) can continue to rotate, the gear wheel 313 (FIG. 21), which is driven by shaft 303 via the gear wheel 311 and pulleys, is supported on the shaft 314 by means of a slip coupling 370, which is shown in further detail in FIG. 25. This slip coupling makes it possible for the second group of rollers to continue rotating while the first group is stopped. The paper web tube then tears.

The slip coupling functions as follows: The roller 250 is supported on the shaft 314 in the groove 369 by means of the tongue 369'. The gear wheel 313 rests laterally on the roller 250 but is not solidly connected to it. Inside the gear wheel 313, there is a further gear wheel 371, whose left-hand shoulder 371' is seated on an associated shoulder face 313' of the gear wheel 313. The gear wheel 371 is coupled in the direction of rotation to the shaft 314 by the tongue 372 also engaging the groove 369 and is pressed from right to left (in FIG. 25) into contact against the gear wheel 313. An adjusting screw 374 is screwed into a recess 373, provided with a female thread 373', in the gear wheel 371. The adjusting screw, with its outer shoulder 374', presses against the cup spring 375, which in turn, with its outer leg 375' bent over inward, exerts pressure on the gear wheel 313. The adjusting screw 373 is fixed in the axial direction because it is screwed onto a male thread of the tubule 376, which is disposed fixedly on the shaft 374 by means of a pin 377. In other words, the farther the adjusting screw 374 is screwed inward (to the left in FIG. 25), the harder the cup spring 375 with its leg 375 presses on the end face of the gear wheel 313. As a result, the shaft 314 is coupled frictionally to the gear wheel 313. However, the coupling is dimensioned such that whenever—as described—the shaft 314 is brought to a stop, the gear wheel 313, overcoming this friction, can rotate further. The adjusting screw 374 can be adjusted from outside by the engagement of a suitable pin with one of the transverse bores 378.

The braking device, comprising electromagnet 366 and brake belt 365, is connected to a support plate 380, which is screwed to the frame portion 232 (see FIG. 26).

What is claimed is:

1. A cushioning product comprising:

an elongated paper tube having a longitudinal axis, said elongated paper tube formed from a pair of elongated sheets of paper each having a pair of lateral side edges, said pair of sheets of paper positioned in face-to-face relation such that said lateral side edges of one of said sheets of paper are in confronting relation relative to said lateral side edges of the other of said sheets of paper, each said lateral side edge of said one sheet being joined longitudinally to a respective one of said lateral side edges of said other sheet, said lateral side edges of each sheet not joined to one another, to form said tube, said tube thereby having an entire circumferential wall thickness of only a single thickness of one of said sheets of paper except where said lateral side edges of said sheets of paper overlap, said tube being crumpled along the longitudinal axis of said tube so as to have creases which are generally transverse to the longitudinal axis of said tube and which extend circumferentially around said tube, said crumpled paper tube having a generally annular cross-section with an outer diameter and an inner diameter defining a longitudinal bore of said crumpled paper tube, said crumpled paper tube having a resilience greater than that of said elongated paper tube in an uncrumpled state.

2. The cushioning product of claim 1 wherein said elongated paper tube is also crumpled in a radial direction.

3. The cushioning product of claim 1 wherein said confronting lateral side edges of said sheets are adhesively joined together.

4. The cushioning product of claim 1 wherein said paper tube is a Kraft paper tube.

5. A supply of sheet stock material from which to produce a cushioning product, said material comprising:

a pair of elongated sheets of paper each having a pair of lateral side edges, said pair of sheets of paper positioned in face-to-face relation such that said lateral side edges of one of said sheets of paper are in confronting relation relative to said lateral side edges of the other of said sheets of paper, each said lateral side edge of said one sheet being joined longitudinally to a respective one of said lateral side edges of said other sheet, said lateral side edges of each sheet not joined to one another, to form a paper tube, said tube thereby having an entire circumferential wall thickness of only a single thickness of one of said sheets of paper except where said lateral side edges of said sheets of paper overlap, said tube having a longitudinal axis, said paper tube being adapted to be supplied to a machine that crumples said paper tube into the cushioning product.

6. The material of claim 5 wherein said confronting lateral side edges of said sheets are adhesively joined together.

7. The material of claim 6 wherein an adhesive is positioned between said confronting lateral side edges of said sheets.

8. The material of claim 5 wherein said paper tube is wound about a transverse axis generally perpendicular to the longitudinal axis of said tube into a roll.

9. The material of claim 5 further including longitudinally spaced lines of separation facilitating separating said paper tube in two.

10. The material of claim 9 wherein said longitudinally spaced lines of separation are perforations.

11. The material of claim 5 wherein said paper tube is a Kraft paper tube.

12. A supply of sheet stock material from which to produce a cushioning product by crumpling said material, said material comprising:

a pair of elongated sheets of paper each having a pair of lateral side edges, said pair of sheets of paper positioned in face-to-face relation such that said lateral side edges of one of said sheets of paper are in confronting relation relative to said lateral side edges of the other of said sheets of paper, each said lateral side edge of said one sheet being joined longitudinally to a respective one of said lateral side edges of said other sheet, said lateral side edges of each sheet not joined to one another, to form a paper tube, said tube having a continuous circumferential wall which is completely closed and having a longitudinal axis, said paper tube being adapted to be supplied to a machine that crumples said paper tube into the cushioning product, wherein said tube is formed from said pair of said elongated sheets of paper and a pair of strips of paper, one of said strips of paper positioned so as to overlap one said lateral side edge of both said sheets of paper and the other of said strips of paper positioned so as to overlap the other said lateral side edge of both said sheets of paper, wherein an adhesive is positioned between overlapping portions of said strips of paper and said lateral side edges of said sheets of paper, an entire thickness of said circumferential wall of said tube thereby being only a single thickness of one of said sheets of paper or one of said strips of paper except where said strips of paper and said lateral side edges of said sheets of paper overlap.

13. The material of claim 12 wherein said paper tube is wound about a transverse axis generally perpendicular to the longitudinal axis of said tube into a roll.

14. The material of claim 13 further including longitudinally spaced lines of separation facilitating separating said paper tube in two.

15. The material of claim 14 wherein said longitudinally spaced lines of separation are perforations.

16. The material of claim 12 wherein said paper tube is a Kraft paper tube.

* * * * *